United States Patent
Iwamura

(10) Patent No.: US 6,925,180 B2
(45) Date of Patent: Aug. 2, 2005

(54) PC CARD RECORDER

(75) Inventor: Ryuichi Iwamura, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 861 days.

(21) Appl. No.: 09/965,045

(22) Filed: Sep. 27, 2001

(65) Prior Publication Data

US 2003/0059047 A1 Mar. 27, 2003

(51) Int. Cl.[7] .............................................. G06F 11/30
(52) U.S. Cl. ..................... 380/37; 713/200; 713/201
(58) Field of Search ........................... 380/37; 713/200, 713/201

(56) References Cited

U.S. PATENT DOCUMENTS

| | | | |
|---|---|---|---|
| 5,270,828 A | * 12/1993 | Mogi | 386/101 |
| 5,305,113 A | * 4/1994 | Iwamura et al. | 386/68 |
| 5,471,450 A | * 11/1995 | Yonemitsu et al. | 369/47.49 |
| 5,715,354 A | 2/1998 | Iwamura et al. | |

OTHER PUBLICATIONS

OpenCable™ Architecture, Michael Adams, Cisco Press, 2000, pp. 380–400.
1– SCTE–DVS064 Part B, DVS–131.
2– PC Card Standard 7.4.
3– PCMCIA System Architecture, Don Anderson, Addison–Wesley Pub., ISBN 0201409917.
4– OpenCable HOST–POD Interface Specification.
5– OpenCable POD Copy Protection System.
6– Applied Cryptography, Burce Schneier, John Wiley and Sons, ISBN 0–471–11709–9.
7– ISO–IEC 13818 International Standard for the Transport of Compressed Digital Media (MPEG).

* cited by examiner

Primary Examiner—Thomas R. Peeso
(74) Attorney, Agent, or Firm—Miller Patent Services; Jerry A. Miller

(57) ABSTRACT

A PC card video recorder. The conditional access functionality of a Point Of Deployment module (POD) is augmented by providing solid state memory on a PC card for recording and playback of programming. An encrypted video stream from a television Set-Top Box (STB)or other appliance is decrypted in the PC card. The decrypted video stream is then filtered to remove information not relevant to a program to be stored. The filtered video stream is then applied to the solid state memory. During playback, the video stream is retrieved from the memory and encrypted prior to transmission to the STB. Intra-pictures can be played back rapidly to provide a fast forward mode by reference to a table or packet header storing starting and ending address of the intra-pictures. Multiple POD card interfaces can be provided in the STB to accept multiple PC card recorders. Pairing security can be provided by checking a recording STB identifier against a playback STB identifier.

153 Claims, 10 Drawing Sheets

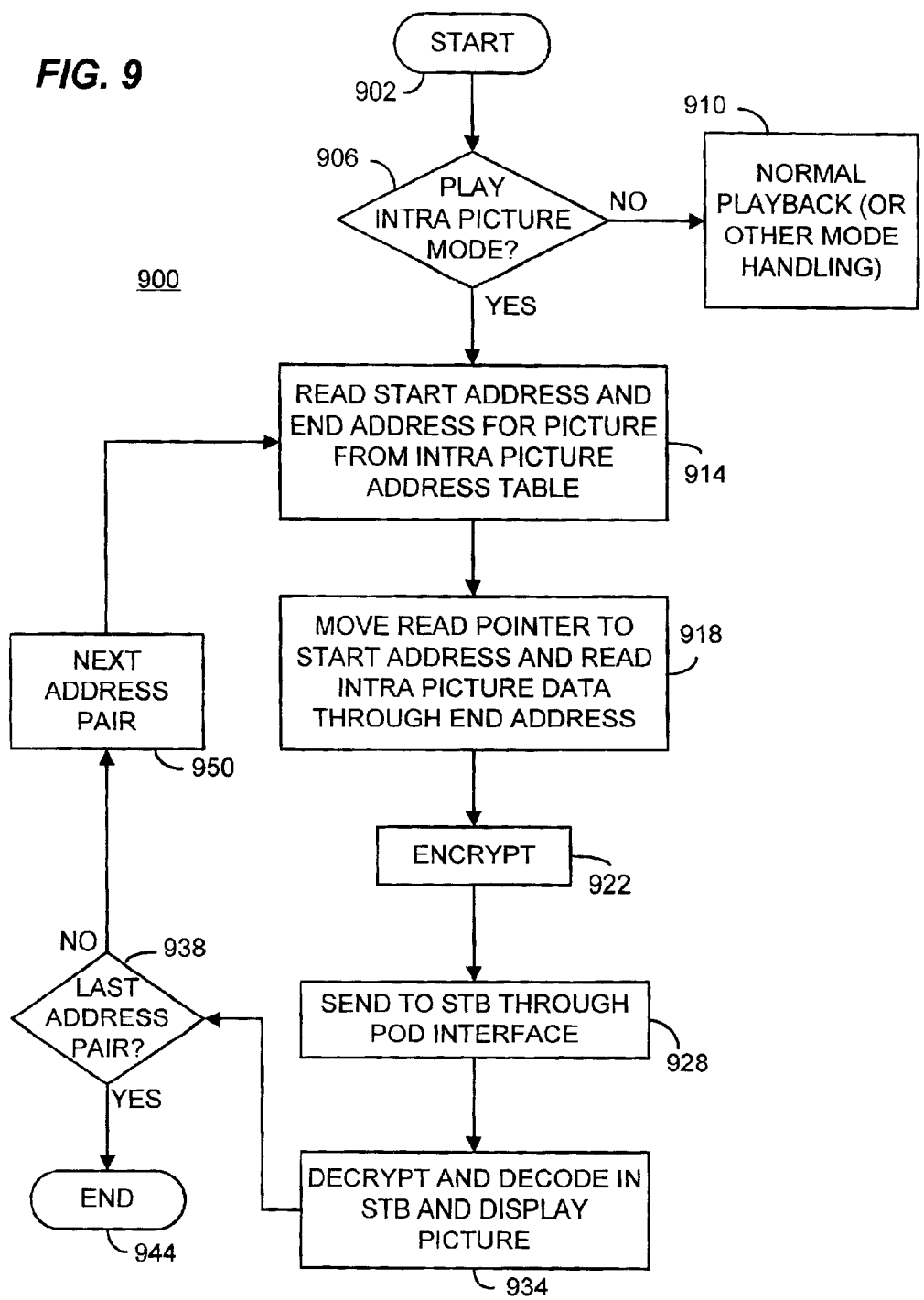

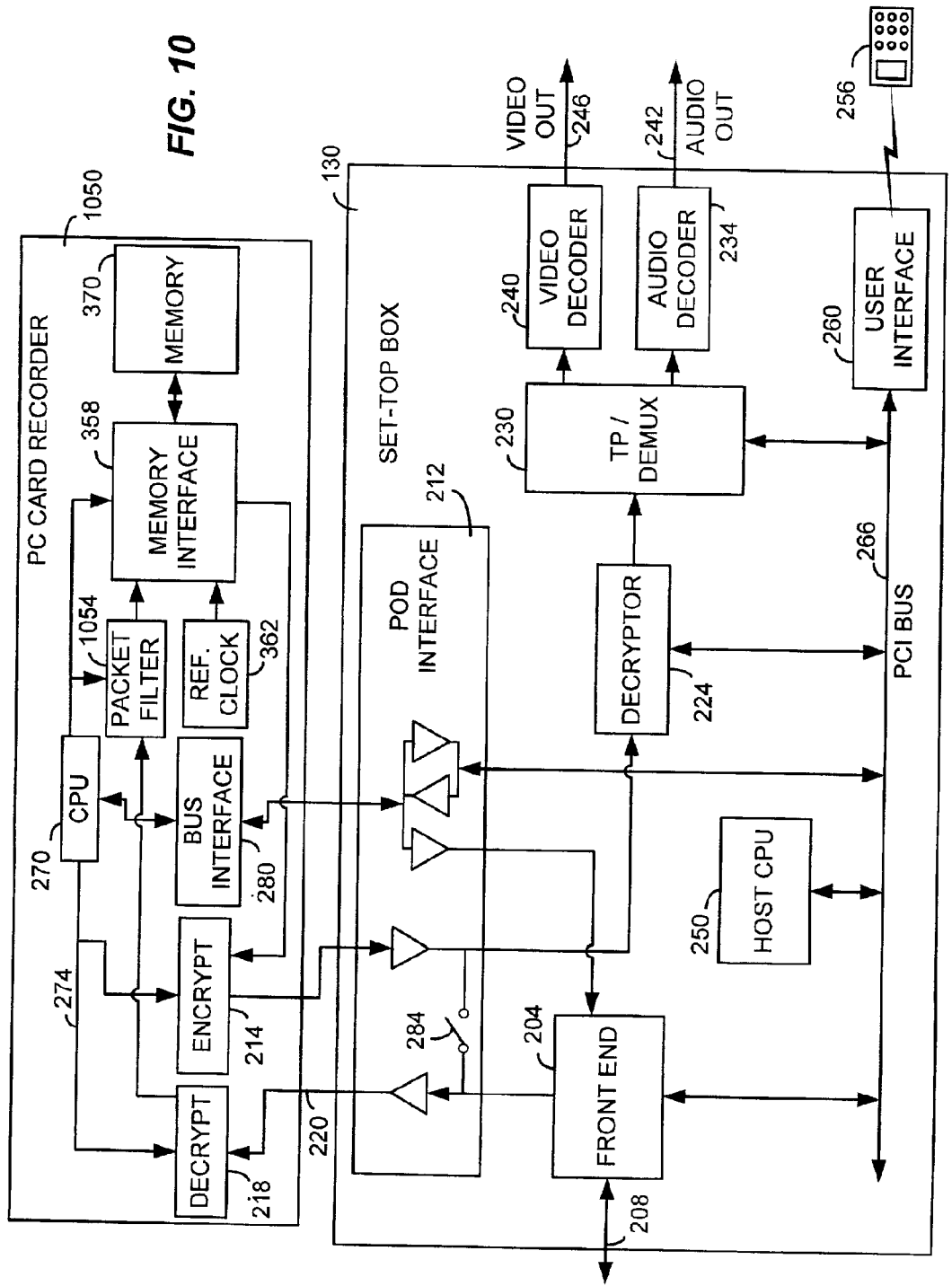

PC CARD RECORDER

CROSS REFERENCE TO RELATED DOCUMENTS

This application is related to U.S. patent Application Ser. No. 09/538,568, filed Mar. 29, 2000, entitled "Secure Conditional Access Port Interface" to Maruo, et al., which is hereby incorporated herein by reference.

FIELD OF THE INVENTION

This invention relates generally to the field of digital video recording. More particularly, this invention relates to a method and apparatus for recording digital video signals using a Set-Top Box or other conditional access Point of Deployment (POD).

BACKGROUND OF THE INVENTION

Personal Video Recorders (PVR) have recently been introduced to the marketplace to permit digital recording of television broadcasts (whether over cable, satellite, or other broadcast technique). Such devices record television programming using a hard disc drive (HDD). A HDD generally has large memory capacity and is well suited for long recording time. However, HDDs have many disadvantages also. They are generally physically large, and thus an internal HDD requires a relatively large space. An external HDD occupies household space on the top or on the side of a Set-Top Box or TV set.

The recording density of a HDD is rising rapidly while the cost per bit or byte is simultaneously drastically falling. However, the low end of the total cost of a Hard Disc Drive may be limited by the need for a tightly sealed, durable case and a HDD interface. Additionally, by its mechanical nature, a HDD is vulnerable to mechanical shock and when damaged is not easy to repair. Since the HDD a mechanical device, it is usually the least reliable part in a television Set-Top Box or other digital television accessory. Also, replacement of a HDD may be complicated since, usually, the whole of the HDD unit has to be replaced. The limits of the mechanical seek time also limits the speed of certain trick play modes.

In addition to the above disadvantages, a HDD cannot generally be considered very secure since the interface (IDE, SCSI, iLINK) is normally a standard PC type interface. Thus, stored data can be easily read and pirated by connecting the HDD to a PC. This is a distinct disadvantage in an environment where conditional access is used to restrict viewing of copyright material to those who pay the appropriate fees. Although a HDD has many advantages, it is not an ideal storage medium for video recording.

SUMMARY OF THE INVENTION

The present invention relates generally to a PC card recorder suitable for recording digital video. Objects, advantages and features of the invention will become apparent to those skilled in the art upon consideration of the following detailed description of the invention.

Certain embodiments of the present invention provide for methods and apparatus relating to a PC card video recorder. The conditional access functionality of a Point Of Deployment module (POD) is augmented by providing solid state memory on a PC card for recording and playback of programming. An encrypted video stream from a television Set-Top Box (STB) or other appliance is decrypted in the PC card. The decrypted video stream is then filtered to remove information not relevant to a program to be stored. The filtered video stream is then applied to the solid state memory. During playback, the video stream is retrieved from the memory and encrypted prior to transmission to the STB. Intra-pictures can be played back rapidly to provide a fast forward mode by reference to a table or packet header storing starting and ending address of the intra-pictures. Multiple POD card interfaces can be provided in the STB to accept multiple PC card recorders. Pairing security can be provided by checking a recording STB identifier against a playback STB identifier.

Several related methods and apparatus consistent with embodiments of the present invention are described in the present document. By way of exemplary overview, some of these inventions can be summarized, without limitation, by the following descriptions:

A PC card video recording device consistent with an embodiment of the invention has a PCMCIA compliant connector. A decrypter receives encrypted video data through the connector and decrypts the video data into a video data stream. A memory and a a processor are provided. A filter, receives the video data stream, and sends a portion of the video data stream specified by the processor to the memory for storage.

A PC card recording device consistent with another embodiment has a PCMCIA compliant connector. A decrypter receives encrypted data through the connector and decrypts the data into a data stream. A memory and a processor are provided. A filter, receives the data stream and sends a portion of the data stream specified by the processor to the memory for storage.

A PC card video recording and playback device consistent with certain embodiments has a PCMCIA compliant connector and a first decrypter that receives encrypted video data through the connector and decrypts the video data into a video data stream. A solid state non-volatile memory and a memory interface and a processor are provided. A filter, receives the video data stream, and sends a portion of the video data stream associated with a packet identifier specified by the processor to the memory interface for storage in the memory. A reference clock sends timing information to the memory interface for storage with the video data stream. A first encrypter receives data stored in the memory according to a packet identifier associated with the stored data from the memory interface, encrypts the data and sends the data to the connector, under control of the processor.

A method, carried out in a PC card recorder, of storing video programming on the PC card recorder, consistent with certain embodiments includes receiving an encrypted video data stream; decrypting the encrypted video data stream to produce a video data stream; filtering the video data stream to remove data not related to a program identified by a packet identifier to produce a filtered video data stream; and storing the filtered video data stream in a solid state memory.

Another method, carried out in a PC card recorder, of playback of video programming stored on the PC card recorder, consistent with certain embodiments includes identifying a packet identifier associated with a program to be played; retrieving a video data stream associated with the packet identifier from a solid state memory; encrypting the video data stream to produce an encrypted video data stream; and sending the encrypted video data stream to a PCMCIA connector.

A recording module consistent with certain embodiments has a connector suitable for interconnecting with a conditional access point of deployment module (POD) connector in a receiver. A memory is provided and a circuit that receives information through the connector stores the information on the memory.

Another method, consistent with certain embodiments includes receiving a stream of information through a conditional access point of deployment module (POD) connector in a receiver; and storing at least a portion of the stream of information in a memory.

A PC card device consistent with certain embodiments has a PCMCIA compliant connector. A decrypter receives encrypted video data through the connector and decrypts the video data into a video data stream. A memory and a processor are provided. A filter, receives the video data stream, and sends a portion of the video data stream associated with a packet identifier specified by the processor to the memory for storage. An encrypter receives data stored in the memory, encrypts the data and sends the data to the connector, under control of the processor.

A PC card device, consistent with certain embodiments has a PCMCIA compliant connector. A first decrypter receives encrypted video data through the connector and decrypts the video data into a video data stream. A memory and processor and a second encrypter are provided. A filter receives the video data stream, and sends a portion of the video data stream associated with a packet identifier specified by the processor to the second encrypter for encrypting the video data stream to produce an encrypted video data stream. A memory interface receives the encrypted video data stream for storage in the memory, and retrieves the encrypted video data stream from the memory. A second decrypter decrypts the video data stream retrieved from memory. A first encrypter receives video data stream from the second decrypter, encrypts the video data stream and sends the encrypted video data stream to the connector, under control of the processor.

A video device, consistent with certain embodiments has a conditional access point of deployment module (POD) interface for receiving a point of deployment module. A receiver front end unit receives a signal containing video information and sends a video stream to the POD interface. A circuit card coupled to POD interface and receiving the video stream. A memory resides on the circuit card. A memory interface resides on the circuit card for storing video content forming a part of the video stream in the memory.

Another video device, consistent with certain embodiments has a conditional access point of deployment module (POD) interface for receiving a point of deployment module. A receiver front end unit receives a signal containing video information and sends a video stream to the POD interface. A circuit card is coupled to POD interface and receives the video stream wherein the video stream is encrypted. A memory resides on the circuit card. A decrypter resides on the circuit card and decrypts the encrypted video stream to produce a decrypted video stream. A filter resides on the circuit card and removes information from the decrypted video stream not relevant to the video content to produce a filtered video stream. A memory interface resides on the circuit card for storing the filtered video stream in the memory, and for retrieving the stored video stream from the memory to obtain a retrieved video stream. An encrypter resides on the circuit card that encrypts the retrieved video stream and sends the encrypted retrieved video stream to the POD interface.

A method of operation of a video device, consistent with certain embodiments includes sending a video stream to a conditional access point of deployment module (POD) interface; receiving the video stream at a circuit card coupled to the POD interface; and storing video content forming a part of the video stream in a memory residing on the circuit card.

A video device, consistent with certain embodiments has a first conditional access point of deployment module (POD) interface for receiving a first point of deployment module. A second conditional access point of deployment module (POD) interface receives a second point of deployment module. A receiver front end receives a signal containing video information and sending a first video stream to the first POD interface, and a second video stream to the second POD interface.

A method of recording a digital video signal, consistent with certain embodiments, includes receiving a digitally encoded video signal, the signal having pictures encoded as groups of pictures with the groups of pictures having intra-coded pictures, and inter-coded pictures; storing the digitally encoded video signal to an addressable storage device; and storing in a table a starting address and an ending address for each intra-coded picture.

Another method consistent with certain embodiments, of retrieving a digitally encoded video signal stored in an addressable electronic storage device, the signal having pictures encoded as groups of pictures with the groups of pictures having intra-coded pictures, and inter-coded pictures, includes for each of a plurality of intra-coded pictures: looking up a starting address in a table for an intra-coded picture; looking up an ending address in the table for the intra-coded picture; and retrieving the intra-coded picture from the addressable storage device.

A method of recording a digital video signal, consistent with certain embodiments includes receiving a digitally encoded video signal, the signal having pictures encoded as groups of pictures with the groups of pictures having intra-coded pictures, and inter-coded pictures; determining which of the pictures are intra-coded pictures; storing the digitally encoded video signal to a storage device; and storing in a header associated with each intra-coded picture with an identifier identifying the picture to be an intra-coded picture.

Another method, consistent with certain embodiments, of retrieving a digitally encoded video signal stored in an electronic storage device, the signal having pictures encoded as groups of pictures with the groups of pictures having intra-coded pictures, and inter-coded pictures, includes for each of a plurality of pictures: reading a header associated with each picture; determining from an identifier in the header whether the picture is an intra-coded picture; and if so, retrieving the intra-coded picture.

A method of providing pairing security in a PC card recorder, consistent with certain embodiments, includes at the PC card recorder, receiving an identifier from a host device; storing the identifier in the PC card recorder; receiving a digital video signal from the host device; and storing the digital video signal in a memory of the PC card recorder.

Another method of providing pairing security in a PC card recorder, consistent with certain embodiments includes receiving a request to play a stored digital video signal; at the PC card recorder, retrieving a stored host device identifier from a memory; at the PC card recorder, receiving an identifier from the host device; at the PC card recorder, comparing the identifier with the stored identifier; and playing the stored digital video signal from a memory of the PC card recorder if the identifier and the stored identifier match.

A method of recording a television program, consistent with certain embodiments includes receiving a command signal from a remote commander to record a selected television program; at a host processor, determining a packet identifier corresponding to the selected television program; sending the packet identifier along with a record command to a POD interface; at a PC card recorder: receiving a transport stream from the POD interface; receiving the packet identifier and the record command from the POD interface; instructing a transport stream filter to delete packets not associated with the packet identifier; and recording the packets associated with the packet identifier to a memory.

A method of recording a television program at a PC card recorder, consistent with certain embodiments includes receiving a transport stream from a POD interface; receiving the packet identifier and the record command from the POD interface; instructing a transport stream filter to delete packets not associated with the packet identifier; and recording the packets associated with the packet identifier to the PC card recorder connected to the POD interface.

A method of storing information from an MPEG transport stream, consistent with certain embodiments includes receiving a picture from the MPEG transport stream; determining a type associated with the picture; and storing a type indicator along with the picture in a memory.

The methods described above can be carried out in a programmed processor executing instructions stored in any suitable electronic storage medium.

The above summaries are intended to illustrate exemplary embodiments of the invention, which will be best understood in conjunction with the detailed description to follow, and are not intended to limit the scope of the appended claims.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

FIG. 9 is a flow chart depicting a process of an intra picture playback process consistent with certain embodiments of the present invention.

FIG. 10 is an exemplary block diagram of a Set-Top Box with a PC card recorder consistent with certain alternative embodiment of the present invention.

DETAILED DESCRIPTION OF THE INVENTION

Figure 1:
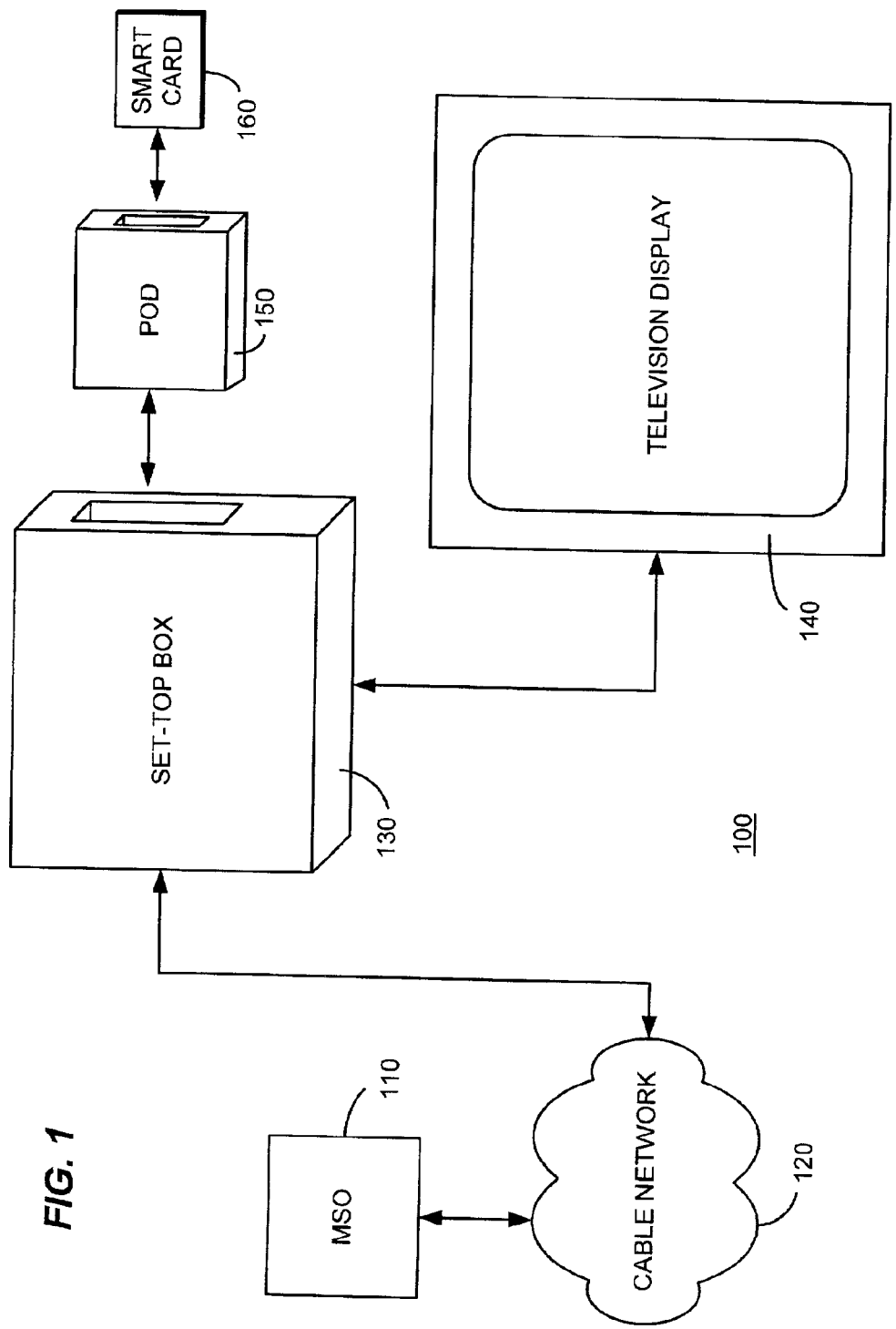
FIG. 1 is a block diagram of an exemplary system with a POD and smart card arrangement that can be used to realize certain embodiments of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

As used herein, the term "video" is to be given its conversational meaning which may include not only pure video content, but may also include audio content as well as other information. This is consistent with the term's use in, for example, in "video cassette recorder", "personal video recorder", "video camera", "music video", etc. and is thus not to be strictly limited to information representing pure visual content. When the term is used to mean pure visual content, it is believed that this will be clear from the context.

Digital broadcast systems include direct broadcast digital satellite systems, interactive World Wide Web ("Web") access systems, and digital cable systems. Digital broadcasting provides a number of advantages to subscribers, such as variety and flexibility of programming; useful and comprehensive support services (such as detailed electronic programming guides), and superior audio and video quality.

The Conditional Access (CA) function of a digital broadcast system allows selective access, for a fee, to premium services such as pay-per-view movies and events. The producers of the movies, events, etc., sometimes require that access to the premium services be controlled in order to protect their commercial interests as well as to enforce copyrights and protect copyright ownership. The digital broadcast system operators (also referred to as Multiple Service Operators, MSOs) also have a commercial interest in limiting access to these premium services to authorized users only.

Subscribers receive digital broadcasts (including satellite, cable and Web broadcasts) via Set-Top Boxes or other similar consumer electronic equipment located in the subscriber's home. With a bi-directional Set-Top Box, in addition to receiving broadcasts, a subscriber can transmit messages to the MSO. Using the bi-directional Set-Top Box (generally, a "transceiver" or "intelligent transceiver"), the subscriber selects a premium service, and the subscriber's selection as well as information needed for billing purposes is transmitted to the MSO. In a common implementation, a "smart card" may be used to store the information needed for billing, and on a periodic basis (perhaps once per month) an automatic connection is made between the transceiver and the MSO so that the billing information can be transmitted to the MSO. In other implementations, a Point of Deployment module (POD) is used without such a smart card, to enable all conditional access functions. In still another embodiment, the POD is used to carry out all conditional access functions in cooperation with a smart card interconnected therewith as a repository for key codes used in the conditional access structure.

Digital broadcast content is vulnerable to unauthorized use and duplication ("pirating") while it is being broadcast, or after it has been received and is being processed. For example, during broadcast, the signal could be intercepted and displayed (or duplicated and rebroadcast) using a transceiver not provided by the MSO. On the other hand, even when a transceiver provided by the MSO is used, the signal could be diverted within the transceiver so that the conditional access functions are bypassed. In either case, copyrights are circumvented. In addition, the MSO is unaware of the unauthorized use and so does not have the information needed to collect the fees it is owed. To prevent such unauthorized use, MSOs typically broadcast a scrambled signal. The signal is descrambled in the transceiver using a key generated by a processor in the STB in cooperation with the smart card. A new key may be generated periodically by the MSO, so that when new key data are received, the STB processor generates a new key using key data received from the MSO in cooperation with the smart card.

While the present invention is described in conjunction with an embodiment of an OpenCable™ compliant television Set-Top Box, this should not be considered limiting since the invention could equally well be implemented within a digital television (DTV), television receiver, television, game console (e.g., the PlayStation series of game consoles from available from Sony Corporation, Tokyo, Japan), a Personal Information Manager or any other suitable receiver or transceiver system.

Turning now to FIG. 1, block diagram 100 shows some of the elements in one embodiment of a system for transmission and receipt of a digital broadcast signal in a cable television system consistent with one embodiment of the present invention. In system 100, an MSO 110 broadcasts programming through a cable network 120 to a Set-Top Box 130 for display on a television monitor 140. In this embodiment, Set-Top Box 150 includes POD card 150 which, in this embodiment, accepts a smart card 160. In other embodiments, smart card 160 may be interfaced directly to the STB 150, rather than the POD card 150, by insertion of the smart card 150 into a smart card slot forming a part of the STB 150. Either embodiment is equivalent for purposes of the present invention. In a system which is OpenCable™ compliant, POD card 150 provides all of the conditional access system components within a single PCMCIA module.

In this embodiment, the POD card 150 alone or in combination with the smart card, is used to provide all conditional access functions for the Set-Top Box 130. The smart card 160 is used (alone or in cooperation with a processor) to generate decryption keys used for descrambling broadcasts and decrypting programming that has been appropriately paid for by the user and to provide billing information to the MSO 110. Those skilled in the art will appreciate that the diagram 100, while depicting the interconnectivity of the POD card 150, the STB 130 and the smart card 160, is intended to be merely illustrative, and is not intended to be a scaled mechanical representation of these components. In the OpenCable™ standard, the POD card 150 or the POD card 150 in cooperation with a smart card, operate to carry out the function described as a "security module". The OpenCable™ standard POD module is described in "OpenCable™ Architecture" by Michael Adams, 2000, Cisco Press, pp 380–400 which is incorporated herein by reference.

Those skilled in the art will appreciate that the video and audio information that make up the program content may be encoded using various digital encoding techniques (e.g., MPEG) to produce data streams that represent the video and audio information. The term "data stream" or "video data stream", as used herein, generally refers to such a digitally encoded stream of information. The stream of information, while often referred to as a "video stream", may have video, audio and other elemental streams. Those skilled in the art will understand from the context when a data stream referred to as a "video stream" may also contain audio elemental components as well as other information, as previously explained. Moreover, while the present invention may be particularly suitable for recording of audio/video (A/V) content, the present invention is not to be considered limited by such since other data (e.g., fax, web content, other data streams, email, etc.) could equally well be stored using the techniques described herein without departing from the invention.

Figure 2:
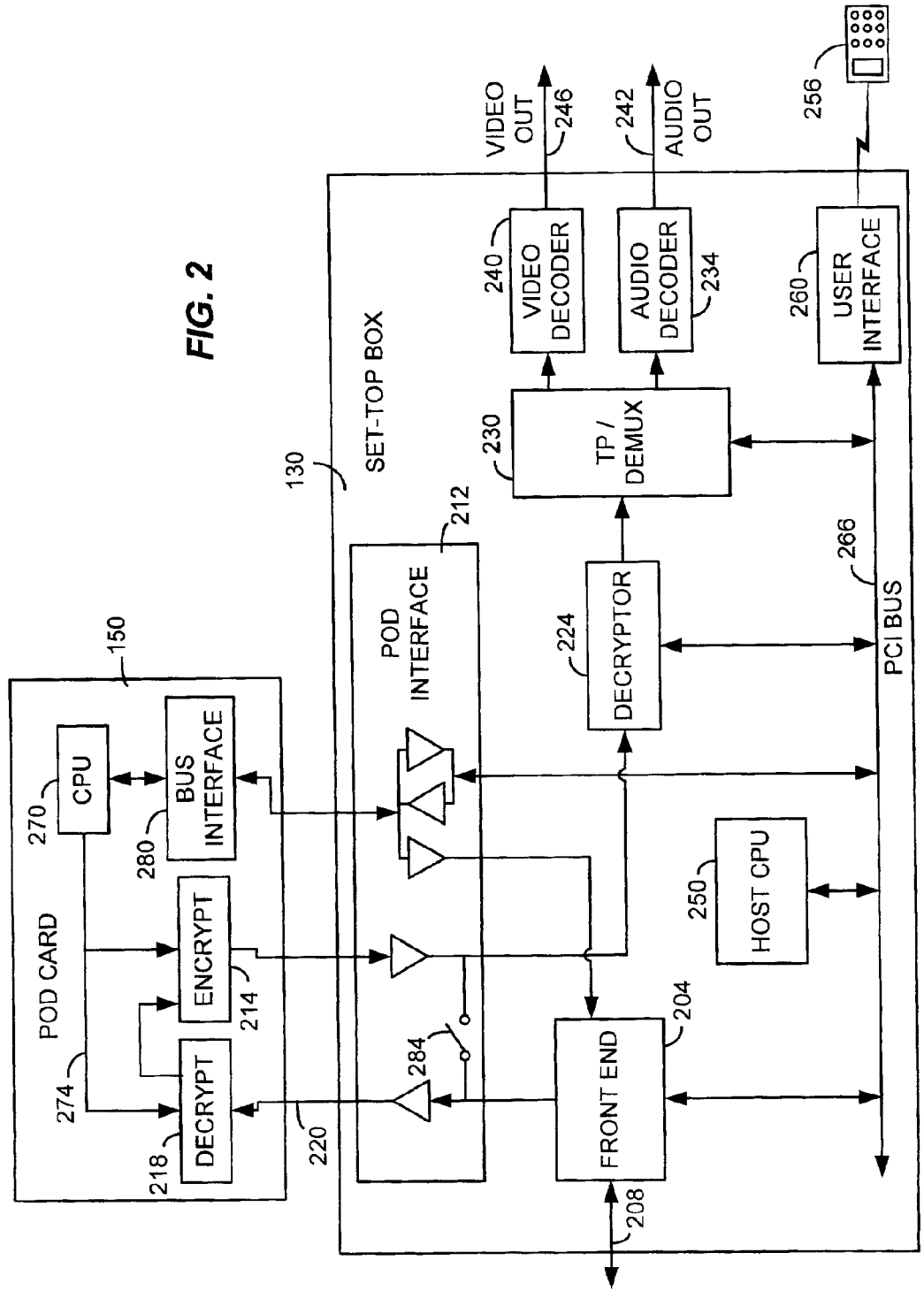
FIG. 2 is a block diagram of an exemplary Set-Top Box consistent with certain embodiments of the present invention.

FIG. 2 shows the exemplary Set-Top Box 130 and associated POD card 150 in greater detail to illustrate the conditional access functions carried out in the POD card 150 as well as the PC card recorder of the present invention. For clarity, not all of the elements of the Set-Top Box 130 or POD card 150 are shown in this illustration. POD card 150, as illustrated, may or may not operate in cooperation with a smart card 160 as depicted in block diagram 100, depending upon the desired implementation.

Front-end unit 204 of the Set-Top Box 130 includes a tuner (not shown), as well as other devices known in the art (e.g., analog-to-digital converter, oscillator, QPSK demodulator, etc.), for receiving a digital broadcast signal from the cable system at 208. Coupled to front-end unit 204 is point of deployment (POD) module 150, coupled through a POD interface 212, which in accordance with certain preferred embodiments, is a PCMCIA compliant interface. POD 150 may be (but is not necessarily) adapted to receive smart card 160 (not shown) that, as described above, can be used to provide billing information to the MSO 110. In other embodiments, smart card 160 may directly interface with the STB 130. The smart card 160 also typically contains information needed to generate decryption keys upon receipt of certain key information provided by the MSO 110. Such decryption keys when generated are used to descramble the digital broadcast signal at 208.

POD 150 includes an encryption block 214 and a decryption block 218. Decryption block 218 uses the key provided by the MSO 110 to descramble the broadcast signal at 220 (if the signal is scrambled). Encryption block 214 also encrypts the signal (if the signal is not encrypted). Connection 220 forms a part of a PCMCIA interface in accordance with certain preferred embodiments.

Set-Top Box 130 also includes a decryption block 224 for decrypting an encrypted broadcast signal received from front-end 208 before the signal is demultiplexed by the transport parser/demultiplexer 230 and sent to audio decoder 234 and video decoder 240. These decoders 240 and 234 are used for decoding, for example, MPEG (Moving Picture Experts Group) video signals and/or Dolby AC3 audio signals. The decoded signals are provided at suitable outputs 242 and 246 to drive other A/V equipment such as a television receiver. The output signals at 242 and 246 may be in any suitable format for driving A/V equipment including S-Video format, PAL format, component video format, NTSC format, analog audio, composite video, etc. In some embodiments, the output signals at 242 and 246 may be combined and modulated to a standard television frequency without departing from the present invention.

Front-end block 204 demodulates and error-corrects a data stream from the MSO 110. When no POD is inserted, switch 284 in POD interface 212 is closed. The output stream from front-end 204 is sent to decrypter 224 through switch 284. Decrypter 224 decrypts the stream and sends it to transport parser/demultiplexer 230. The stream is demultiplexed at the TP/demultiplexer 230 so that video data is appropriately sent to video decoder 240 and audio data is appropriately sent to audio decoder 234. Other information may be demultiplexed at TP/demultiplexer 230 for CPU 250, and is supplied thereto over the system bus 266. The outputs from the two decoders 234 and 240 are sent to the TV set.

User Interface 260 receives an infrared command from remote commander 256 and sends it to Host CPU 250 through PCI Bus 266. All the blocks heretofore described within STB 130 are controlled by Host CPU 250 over PCI Bus 266. Host CPU 250 includes non-volatile and/or volatile memory (not shown) for the software code, working area and temporary data storage operating in a known manner.

Once POD card 150 is inserted to the POD slot of the STB 150, POD interface 212 detects it and informs the host CPU 250 via the system bus 266. Host CPU 250 opens switch 284 in response by sending a command to the POD interface 212 via the system bus 266. The data from the front-end 208 is thus diverted to the POD card 150 and is decrypted by decrypter 218 and re-encrypted by encrypter 214. The re-encrypted data stream goes to decrypter 224 through the POD interface 212. The data stream is processed in decrypter 224 and the blocks after decrypter 224 (blocks 230, 234 and 240) in the same way as when no POD 150 is inserted. Decrypter 218 and encrypter 214 are controlled by the embedded CPU 270 over local bus 274.

CPU 270 also includes volatile and/or non-volatile memory (not shown) for software code storage, working area and temporary data storage. CPU 270 communicates with Host CPU 250 through the POD interface 212 and bus interface 280. The software code in CPU 270 is preferably stored in non-volatile memory and is downloadable to permit updating. Front-end 208 receives the software code from the head end of the cable system. Host CPU 250 transfers the code to CPU 270 using the system bus 266, the POD interface 212 and the bus interface 280. CPU 270 also sends back upstream data to front-end 204 through bus interface 280 and POD interface 212. Front-end 204 receives the data and sends back the upstream data to the head end. The upstream data may include, for example, pay-per-view charge information. The details of POD copy protection are discussed in the OpenCable™ POD Copy Protection System specification which can be obtained from http://www.scmmicrosystems.com/dvb/pod.html).

The encryption method used for the stream sent from the head end of the cable system is dependent upon the particular MSO. Usually, the encryption method is not open to public. The specification of decrypter 218 is also generally a secret to protect the integrity of content from copying. Encrypter 214 of the certain embodiments encrypts the data stream using DES-ECB mode encryption as described in the text "Applied Cryptography", by Bruce Schneier (John Wiley & Sons, Inc. ISBN 0-471-11709-9). Information on the DES standard can be found in FIPS PUB 46-1, 46-2, "Specification for the Data Encryption Standard", National Institute of Standards and Technology; FIPS PUB 74, "Guidelines for Implementing and Using NBS DES", National Institute of Standards and Technology; and FIPS PUB 81, "DES Mode of Operation", National Institute of Standards and Technology. By using a POD card such as 150, each MSO can use its own encryption method to encrypt their data streams. The user can use the same STB even when he/she moves to another MSO's service area by simply obtaining a new POD card 150 from the new MSO and inserting it to the POD card connector (generally a standard PCMCIA connector) of their STB. The Federal Communication Commission is requiring that all the cable STBs have a POD slot by the year 2005 to permit such transportability of STBs.

Thus, as described above, digital broadcast signals at 208 are received by the Set-Top Box 130 at front-end 204 and forwarded to POD 150. The broadcast signal at 220 is descrambled by decryption block 218. Once descrambled, the broadcast signal is encrypted at 214 to prevent unauthorized duplication. Further downstream in the Set-Top Box 130, the broadcast signal is decrypted using decryption block 224 so that it can be decoded (e.g., MPEG or AC3 decoding) in decoders 234 and 240, and subsequently processed so that it can be viewed and/or listened to by an authorized subscriber. These activities are carried out in cooperation with a host CPU 250 upon receipt of control instructions from a user, for example, via commands from a remote commander 256 communicating with a user interface 260 of Set-Top Box 130, e.g., via infrared communication. The various component blocks of the Set-Top Box 130 may communicate using one or more bus structures such as a PCI bus shown as system bus 266. Similarly, POD card 150 operates under control of a supervisory CPU 270 that communicates with the encrypter 214 and decrypter 218 via its local bus 274 and communicates with the host CPU 250 via bus interface 280 connected through the POD interface 212 to PCI bus 266.

Figure 3:
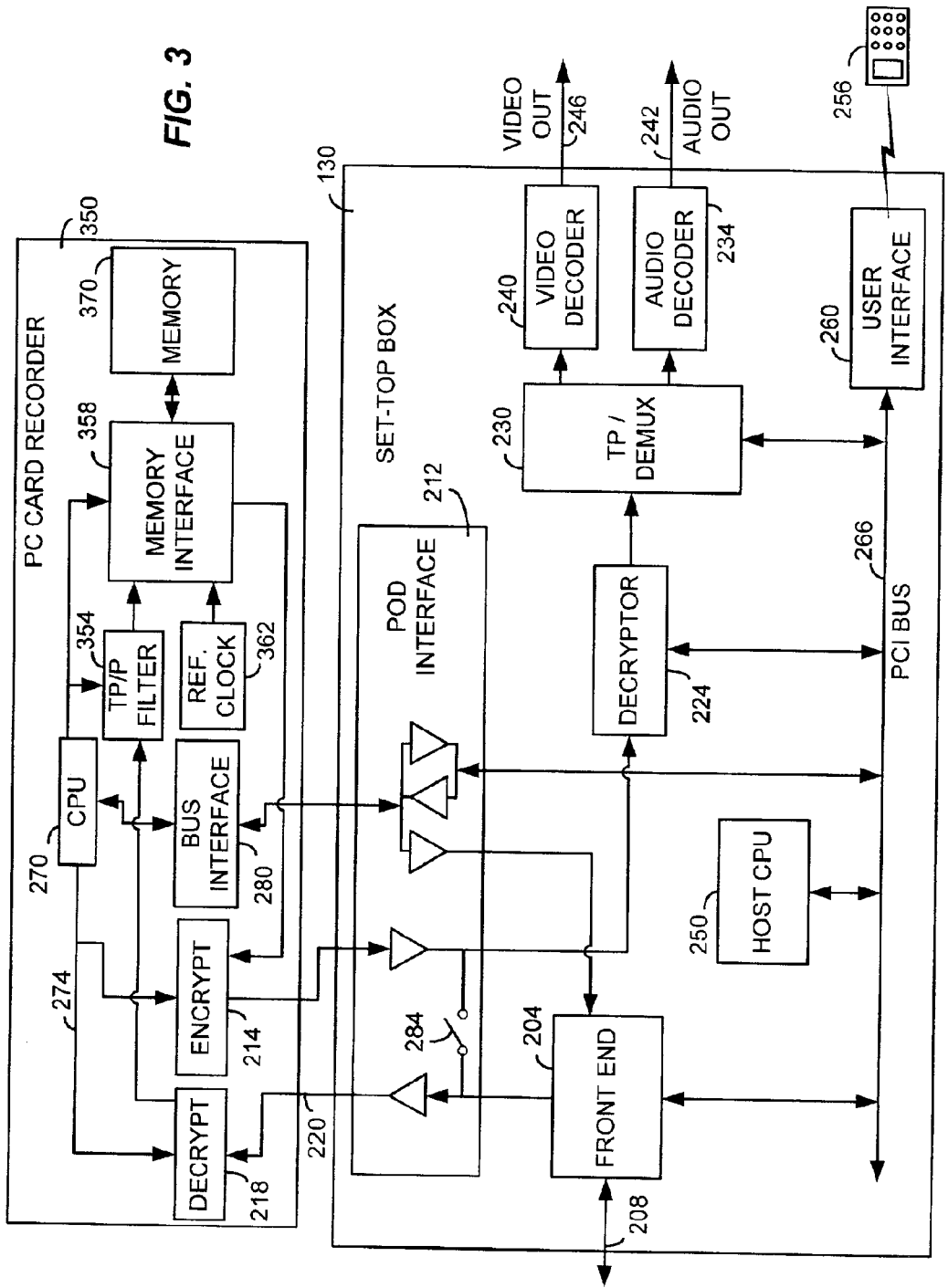
FIG. 3 is an exemplary block diagram of a Set-Top Box with a PC card recorder consistent with certain embodiments of the present invention.

The present invention utilizes a memory device, preferably a solid state non-volatile memory, forming a part of the POD card 150 to provide the functionality of a recorder for storing programming. The current embodiment is especially suitable for short time recording and playback. As the state of the art progresses in production of solid state memory, large storage times should be achievable without use of HDDs. Until then, the POD card with memory can be used for short time recording or short time-shift purposes (i.e., instant replay and short time shifts). 256 Mbytes of memory can be used to record a 4 Mbit/sec (bps) program for approximately 8.5 minutes. As the cost of memory declines, it is anticipated that several Gbytes will be an affordable alternative to HDD technology in the present invention, making it suitable for replacement of HDD technology. Such advances will undoubtably soon make two or more hours of recording possible using solid state memory. The additional circuitry that achieves the storage of programming on the POD card 150 is illustrated in FIG. 3. The term "PC card" as used herein is intended to have the conventional meaning of a computer device having any of the current or future PCMCIA compliant dimensions, connector and interface.

The present PC card recorder provides for using the POD as storage device by adding memory and memory control circuitry. This is accomplished while retaining the POD copy protection functions. POD copy protection is described in the OpenCable™ HOST-POD Interface Specification which can be downloaded from http://www.scmmicrosystems.com/dvb/pod.html, and OpenCable™ POD Copy Protection System which is available to be downloaded from http://www.scmmicrosystems.com/dvb/pod.html. The card size is preferably fully compliant with the PC card standard described in PC Card Standard 7.4 which can be downloaded from http://www.pc-card.com/, and "PCMCIA System Architecture" by Don Anderson, Addison-Wesley Pub Co; ISBN: 0201409917. The connector interface is preferably the same as the OpenCable™

Point Of Deployment (POD) card. No special interface like iLINK or IDE is required. In order to use the PC card recorder of the present invention, the user simply inserts the PC card recorder into the existing POD slot.

In the embodiment shown in FIG. 3, the PC card recorder is shown as 350. The data stream sent from decrypter 218 is parsed in transport parser/packet filter 354 and program information is extracted. The program information is sent to the host CPU 250 through CPU 270, bus interface 280 and POD interface 212. Based on the program information, host CPU 250 generates a program table and displays it on the TV screen using the graphic display capability of the video decoder 240. The user chooses a program he or she wants to see using remote commander 256. User interface 260 receives a command from remote commander 260 and sends it to host CPU 250. Host CPU 250 informs CPU 270 of the PID (Packet Identifier) numbers of the program the user choses. CPU 270 commands TP/P.filter 354 to pass only the specified packets having the selected packet identifier. All the other unnecessary packets (packets not related to the selected program) are dropped here. By way of example, the data rate of the original data stream at the input of the TP/P.filter 354 is generally about 40 Mbit/sec in the case of 256 QAM (Quadrature Amplitude Modulation) cable transmission. After filtering at TP/P.filter 354, the rate is reduced to approximately 4 Mbit/sec. TP/P.filter 354 also modifies the program information, re-packetizes it and inserts it into the stream.

A memory interface 358 receives the partial data stream (i.e., the filtered data stream) from the TP/P.filter 354 and time-stamps each packet using time information from a reference clock 362. The time stamp may be, for example, a 32-bit value that is added to each packet. A 32 bit clock value yields a time resolution of 10 microseconds. A 32 bit clock permits 700 minutes of recording time (($2^{32}$)×10 usec>700 min.). This is long enough for several hours of recording time. If additional recording time is to be accommodated, more bits can be allocated to the time stamp. Time-stamped packets are sent from memory interface for storage in memory 370. Memory 370 is preferably made up of non-volatile solid state memory such as Flash memory, but this is not to be considered limiting since other forms of storage may also be suitable. At the time of playback, the time stamp value is compared with the reference clock in the memory interface 358. When the stamped time comes, the time-stamp is removed from the packet and the packet is dispatched to encrypter 214 and then to the decrypter 224 for playback. The time stamp system retains each time gap between packets.

When the user specifies a record or playback mode from remote commander 256, the host CPU 250 receives the command through the user interface 260 and sends a corresponding command to CPU 270. CPU 270 controls memory interface 358 to move a write pointer and/or a read pointer in memory 370, to control the write and read operations as will be described later.

TP/P.filter 354 has packet marking capability for use in carrying out special operations referred to herein as "trick mode" operations. A special packet or data can be inserted at the top of certain types of pictures, for example, MPEG (Moving Pictures Expert Group) intra coded pictures as described in ISO-IEC 13818 International Standard for the Transport of Compressed Digital Media (MPEG). This provides the STB 130 to provide intra picture only playback to produce a fast-forward effect. Marked packets can be selected by the TP/demultiplexer 230 which can discard other packets until the next marker is found. Also, CPU 270 can create a table of starting and ending addresses of Intra pictures by using the TP/P.filter 354 to parse the data stream. Based on this table, CPU 270 commands the memory interface 358 to successively move the read pointer from one intra picture to the next one after another. This provides efficient memory access for smooth fast-forward playback. This process is described in additional detail in connection with FIG. 8.

In one embodiment, a packet header can be added to the top of each packet with the header containing a time stamp and an identifier that can be used to identify the various packet types (e.g., I-picture packets). In thi embodiment, the TP/P.filter 354 parses each packet. When a parsed packet is the top of an I-picture or the end of an I-picture (or top of the next picture), TP/P filter 354 sets an I-picture top (or end) indicator in an additional header for the packet. The packet is stored with this additional header. In fast-forward mode, all the time stamps are ignored. The packets stored in memory 370 are read successively. Memory interface 358 detects the I-picture atop and end flags and sends only I-picture packets to encrypter 214. Only I-picture packets are sent to STB 130. TP/Demux 230 does not have to parse packets again to get I-picture data.

FIG. 4, which includes FIGS. 4A–4F, shows how the data is written to and read from the memory 370, often simultaneously, by use of the read and write pointers under various circumstances. When the write or read pointer reaches the last address of memory 370, it returns to the first address. Therefore, the pointers can be shown as clockwise moving points on a circle, and the memory can be considered to be a circularly arranged memory.

For long recording times, conventional memory management techniques can be used to manage access to the memory 370. In one embodiment, CPU 270 manages all accesses to the memory with a small portion of the memory allocated for short time delay functions. The remaining area is used for longer recording functions. CPU 270 manages the recording area to minimize fragmentation and carry out other memory management functions.

Figure 4A:
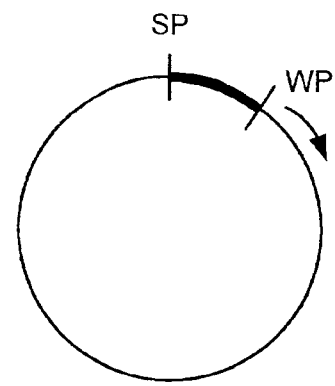
FIG. 4, which is made up of FIGS. 4A, 4B, 4C, 4D, and 4E illustrate the operation of a circular memory arrangement consistent with certain embodiments of the present invention

The recording operation is discussed with reference to FIG. 4A. The write pointer (WP) starts at the starting point (SP), which is the first address of memory 370. The bold arc spanning SP to WP indicates a written area that has not yet been read. When recording begins, for example as a result of a user command using remote commander 256, the write pointer WP is advanced clockwise as the program is recorded to memory 370. In the case of a small memory embodiment (i.e., only enough memory for a few minutes of recording time), recording may begin whenever a user selects a program so that live replay functions can be provided. In that case, the memory 370 is used as a cache for incoming programming to allow for repeat play. In other embodiments, a small amount of memory can be set aside (i.e., one minutes worth of recording time) as a cache (configured as circular memory) that is always recording the currently viewed programming.

In certain embodiments, a specified area of memory 370 is used to handle short time delay functions (e.g., five minutes worth of memory). This specified area of the memory 370 is overwritten repeatedly. The other area of memory 370 is used for longer recordings. When creating a long recording, if necessary, the user can pause or delay playback similar to the same functions as described for short time delays. But, different areas of storage are used. In this embodiment, the user specifies whether long or short term recording is to be used before recording. Using short time recording in this manner does not guarantee that the information will not be overwritten. Other embodiments will also occur to those skilled in the art.

Figure 4B:
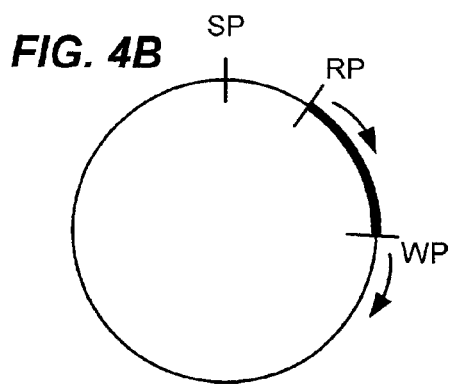
Figure 4C:
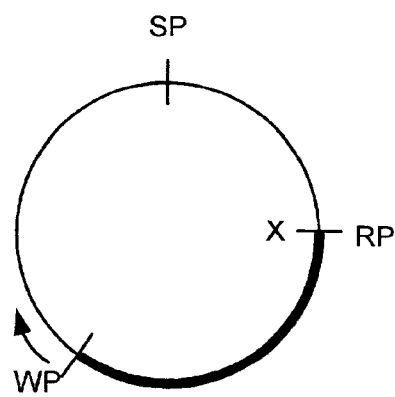

When playback begins, the read pointer (RP) starts reading with SP as illustrated in FIG. 4B. In the normal playback mode, both WP and RP proceed at approximately the same speed. More precisely, the write rate and the read rate may not be identical. There is generally a range of drifting because the stream is usually encoded at variable rate. However, the average rate is fixed. Therefore, WP and RP keep approximately the same distance over a long time period. Thus, RP never catches up with WP. In this mode, the user is essentially time shifting live programming. That is, for example, if the distance in time between RP and WP is two minutes, (i.e., using short term recording) the user is viewing the programming that was broadcast live two minutes prior. Similarly, generally for long term recording using a larger memory, the writing may correspond to recording a program being currently broadcast, while the reading may correspond to viewing a program that was recorded days earlier.

In another time-shifting operation, the user issues a pause instruction at a time corresponding to X from remote commander 256. The read pointer RP stops at point X in FIG. 4C, but the write pointer WP keeps moving ahead. When the user re-starts decoding (playback), for example by issuing a "play" command from remote commander 256, the read pointer RP begins advancing. The maximum time-shift period is essentially the amount of record time that can be stored in the memory 370. In the case of a memory that contains protected information (i.e., a program stored for later viewing), the maximum time shift period corresponds to the amount of free memory in memory 370.

Especially in the case of systems able to store large amounts of data, it is desirable to be able to preserve stored programming for long periods of time. Thus, it is desirable that the user should have to explicitly issue an erase instruction before overwriting such recordings. The details of programming such functions are within the ordinary skill in the art given the present disclosure.

The present invention, in certain embodiments, provides the ability to catch up with the current broadcast by use of a "catch-up" mode of play. Such operation is desirable, for example, if a viewer has to leave the room for a brief period of time and wishes to pause a live broadcast and then return to viewing it. The catch-up mode is similar to the time-shift mode in that reading and writing are carried out simultaneously with the read pointer RP lagging the write pointer in time. But in the catch-up mode, by dropping certain pictures, RP is advanced faster than WP so that it eventually catches up with WP. Time stamps are ignored in this mode since the dropping of certain pictures results in a desired timing difference that shortens playback time versus record time. For example, several bi-directional pictures (MPEG B-Pictures) in a GOP (Group of Pictures) may be dropped by TP/demultiplexer 230. In one embodiment all such bi-directional pictures are dropped. In another embodiment, one (e.g., the first) bi-directional picture, if present, is dropped from each GOP. In other embodiments, varying numbers of bi-directional pictures can be dropped from a GOP (e.g., one from each third GOP with B-Pictures, or three from each GOP having B-Pictures). The more such bi-directional pictures are dropped, the faster RP advances toward WP, but dropping large numbers of bi-directional pictures may result in noticeable loss of picture smoothness. Accordingly, it may be desirable to provide the user with an ability to select, e.g., using remote commander 256, a catch up speed. In such an embodiment, catch-up speed control commands from the remote commander correspond to numbers of bi-directional pictures that can be dropped. The user can, thus, balance the catch-up speed against desired picture smoothness. Bi-directional pictures are selected for this process since they depend, at least in part, on both prior and future pictures. Thus, much of the information in a B-Picture will be obtained from other pictures (MPEG I-Pictures or P-Pictures).

During the catch-up mode of operation, the data are read intermittently from memory 370 as a result of a request from TP/demultiplexer 230, possibly based upon the number of bi-directional pictures to be dropped. Preferably, a small number of pictures are dropped to disguise this playback as a normal playback. The dropped pictures cause RP to advance a little faster than WP. Thus, RP eventually catches up with WP. After catching up, the mode switches to a normal playback mode. In this manner, the user can catch up to a current time of a program currently being broadcast without unacceptable loss of picture smoothness.

During the various playback modes, the playback speed can be controlled as follows, in certain embodiments. In normal playback mode, the each packet is dispatched to the A/V decoder based on time stamp so that the A/V decoder buffer will not overflow or underflow. In trick play modes, the time stamp is ignored. Packets are sent to the A/V decoder one after the other in rapid succession. When the buffer fills, the reading from memory pauses until the A/V decoder reads data from the buffer and frees enough buffer space to accept more data. The pause period varies according to the mode. The pause is short in fast forward or rewind mode and slow in slow motion mode.

The present invention also contemplates a fast forward mode. In this mode, data from memory 370 are read ignoring time stamps. The TP/demultiplexer 230 captures and decodes only Intra pictures (i.e., MPEG I-Pictures). Intra pictures do not depend on other pictures (other MPEG I-Pictures, B-Pictures or P-Pictures) for any of their information. Since each MPEG GOP contains an Intra picture, this provides a handy way to present a representation of the group of pictures as a fast forward mechanism.

In normally encoded MPEG video, the type of picture (I, B or P) is conventionally determined by analysis of the data to make a determination as to the picture type. In order to enhance the ability to provide fast forward and other operations, the present invention contemplates making a determination of a picture type at the time of recording and storing this information either in a table or as a packet attribute in a packet header.

Figure 4D:
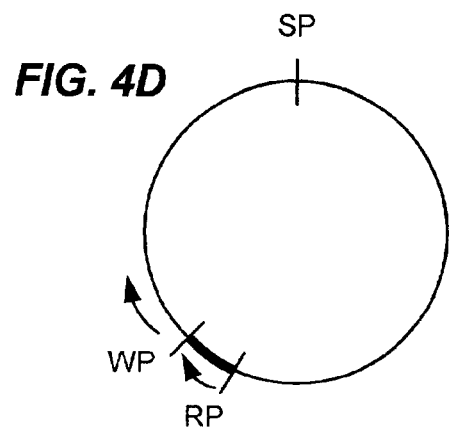

The data stream from memory 370 stops and goes frequently by request of TP/demultiplexer 230 as the I-Pictures are retrieved without retrieving any of the other pictures stored in memory 370. The read pointer RP thus jumps from one I-Picture address to another and advances substantially faster than WP. Eventually, RP catches up with WP as shown in FIG. 4D. RP stops just before WP and the mode is switched to normal playback mode if requested.

As described earlier, by using an intra picture address table, TP/multiplexer 230 can easily find the top of each of the Intra pictures. In this case, RP directly jumps to the top address listed in the table. When RP reaches the end address, it jumps to the next top address as specified in the intra picture address table. Thus, only intra picture data is sent to STB 130 for decryption, decoding and playback. This mode is described in additional detail in connection with FIGS. 8–9. Information regarding B and P pictures can also be tabulated to facilitate other modes of operation.

Figure 4E:
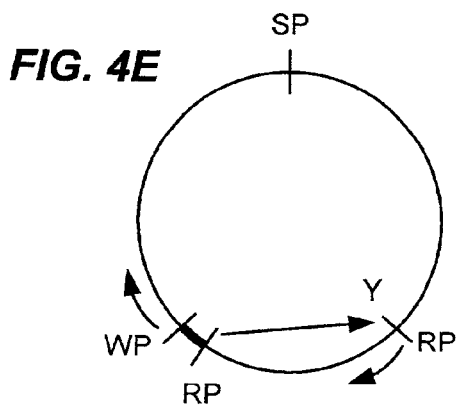

The present invention also contemplates a "repeat" mode of operation similar to an instant replay feature. FIG. 4E illustrates the repeat mode. WP stops. RP jumps back to a preceding memory location Y and starts reading from there again. RP stops at a memory location just before the write pointer WP. The user may playback the sequence over and over again, in which case, RP repeatedly jumps to Y.

In another embodiment, wp does not stop, but continues advancing so the viewer doesn't lose programming while repeating. The point at which the command is issued can be stored to form a starting point for the repeat. For example, if the viewer issues another repeat command within 1 minute, the same image is repeated again. Then, the viewer could enter the catch-up mode and not miss any programming. In this case, wp advances in a controlled manner so as not to overwrite a recorded area that has not yet been read.

Backward play at slow and fast speed can be possible by using the technique described in U.S. Pat. No. 5,715,354, entitled "Image data regenerating apparatus" to Iwamura et al. which describes an MPEG video backward play method using an optical video disc as a storage and is hereby incorporated by reference. This same method can be applied to solid state memory such as memory 370.

Figure 5:
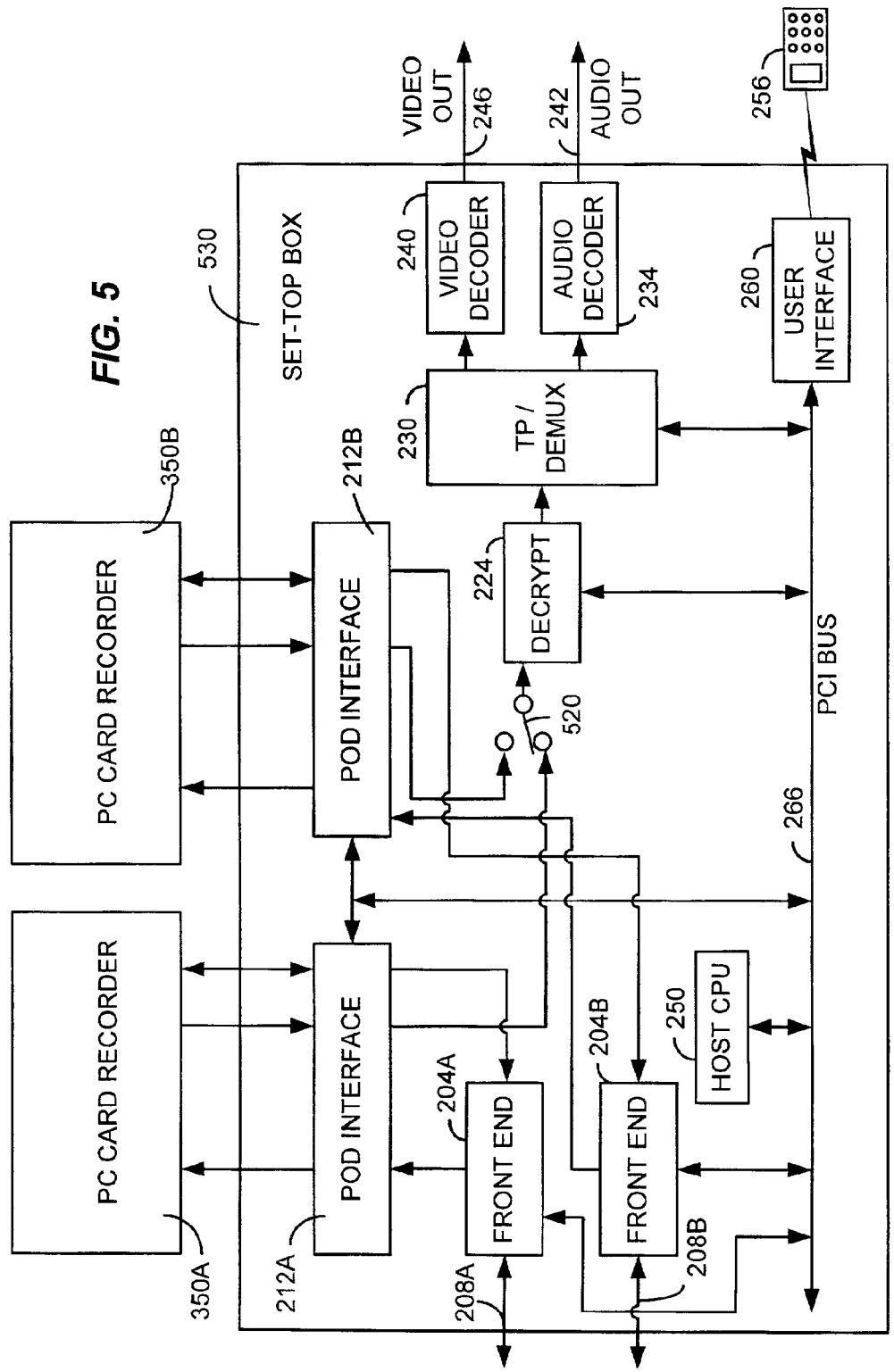
FIG. 5 is another exemplary Set-Top Box accepting multiple PC card recorders consistent with certain embodiments of the present invention.

FIG. 5 illustrates another embodiment of the PC card recorder and STB arrangement consistent with the invention in which a second PC card can be added. In this embodiment, the user can, for example, time-shift one program to the first PC card recorder while recording another. In this embodiment, Set-Top Box 530 has two front-end units 208A and 208B. STB 530 also has two POD interfaces 212A and 212B receiving data streams respectively from the front-end units 208A and 208B. PC card recorders 350A and 350B (or other POD devices) are inserted to each of the POD interfaces respectively. The two PC card recorders can thus be configured to record different programs under the control of host CPU 250. For example, Front-end 208A can be tuned to one program where the program is time-shifted by PC Card Recorder 350A. The time shifted program is sent to decrypter 224 through a switch 520, which is configured to connect the data stream from POD interface 212A connects to the decrypter 224. Thus, the program being processed by PC card recorder 350A is available for the user to watch.

Meanwhile, Front-end 208B can be tuned to a second program. PC card recorder 350B can be configured under control of host CPU 250 to record the data stream from front-end 208B. When the user wants to watch the second program, he or she simply changes the program source, e.g., by using a source switch button on remote commander 256. The command is received by host CPU 250 through user interface 260. Host CPU 250, in response to the command, changes the setting of switch 520 to connect a data stream from POD interface 212B to the decrypter 224. The program recorded in PC card recorder 350B is thereby decoded. In another embodiment, the STB 530 can be provided with a second decrypter such as 224 and TP/demultiplexer such as 230. In this embodiment, the two data streams from both PC card recorders can be decoded simultaneously.

In this embodiment, as will be clear to those skilled in the art, the STB 530 can also accommodate one PC card recorder and one POD. The signals at 208A may originate at the same cable connection or may be supplied from different sources without departing from the invention.

The structure described above provides not only for enhanced storage and playback of video, but also provides a greater level of security. Compared with a Hard Disc Drive, a PC card is less vulnerable to reverse-engineering. The card is sealed in a manner that makes it difficult to open without damage. This makes is more difficult to appropriate an unencrypted digital video stream, and thus breech conditional access and copyright. Moreover, since the present PC card recorder internally has a decrypter 218 and an encrypter 214, and since the decryption and the encryption algorithms are fully under the MSO's control, the information stored in the PC card recorder is not useful outside the system under the control of the MSO. By downloading new software and/or encryption/decryption keys to each STB, the MSO can freely change encryption/decryption algorithm at minimum cost. Thus, this system provides maximum security to the PC card recorder.

Figure 6:
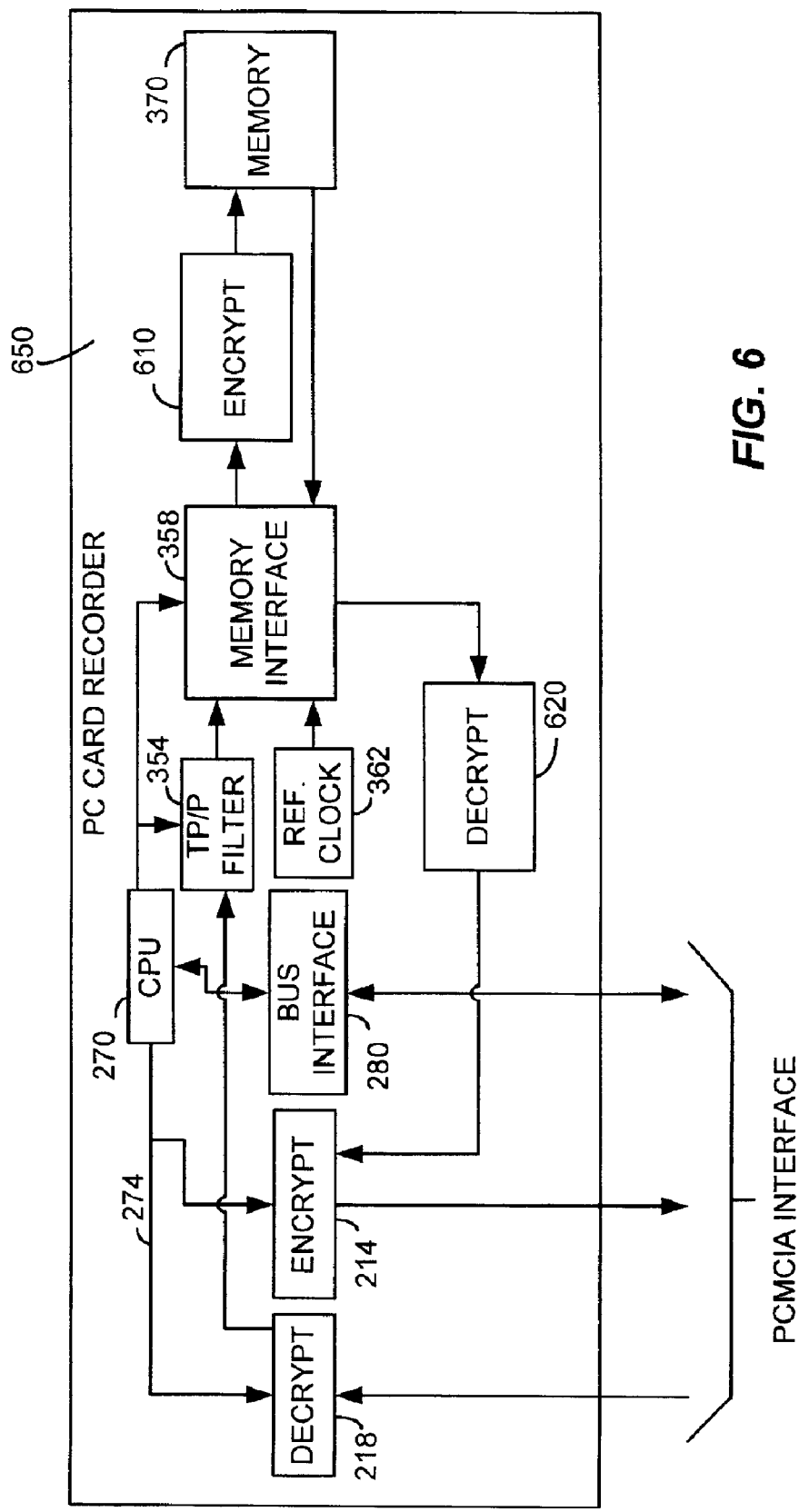
FIG. 6 is an exemplary block diagram of a PC card recorder consistent with an embodiment of the present invention in which additional encryption is provided for enhanced security.

In order to further enhance security in the present system, the PC card recorder shown in FIG. 6 as 650 can be utilized. In this embodiment, the data stream may be encrypted before being written to memory 370 and decrypted after being read from the memory 370. In one embodiment incorporating such encryption, an encrypter 610 is placed between TP/P.filter 354 and memory interface 358 to encrypt data before it is written to memory 370. In a similar manner, a decrypter 620 can be placed between memory interface 358 and encrypter 214. This encryption gives more security to the PC card recorder, since there is no data stored "in the clear." Moreover, different encryption/decryption algorithms can be used in encrypter 610 and decrypter 620 than used in encrypter 214 and decrypter 218 to further thwart attempts to access the data in memory 370. If the encrypter 610 and decrypter 620 are integrated within memory interface 358 and 214 respectively, the areas wherein clear program content is available is further limited.

For content protection, the particular PC card recorder recorded with a particular STB should preferably be usable with only one STB. That is, content recorded on a particular STB should preferably only be capable of playback on the same STB. This is referred to as pairing security and further limits any attempts to misappropriate content. The present PC card recorder can, in certain embodiments, provide pairing security to help assure this is the case. The STB 130 has its own unique ID number, for example stored inside host CPU 250. The number cannot be readily read out of the STB. In one embodiment, when recording, the PC card recorder 350 reads this number and stores it in the non-volatile memory associated with CPU 270. When a playback command is received, the PC card recorder reads the number from the STB 130 and compares it to the stored number. If the number is are identical to the number PC card 350, playback starts. If not, playback is prohibited because the STB is not the same one used for recording. The unique ID number may be encrypted before being sent to the PC card recorder 350 and decrypted by CPU 270 to protect the system from unauthorized theft of the content stored in the PC card recorder 350. Equivalently, other information exchanges can be made and compared to assure that the recording STB is the same as the playback STB.

Figure 7:
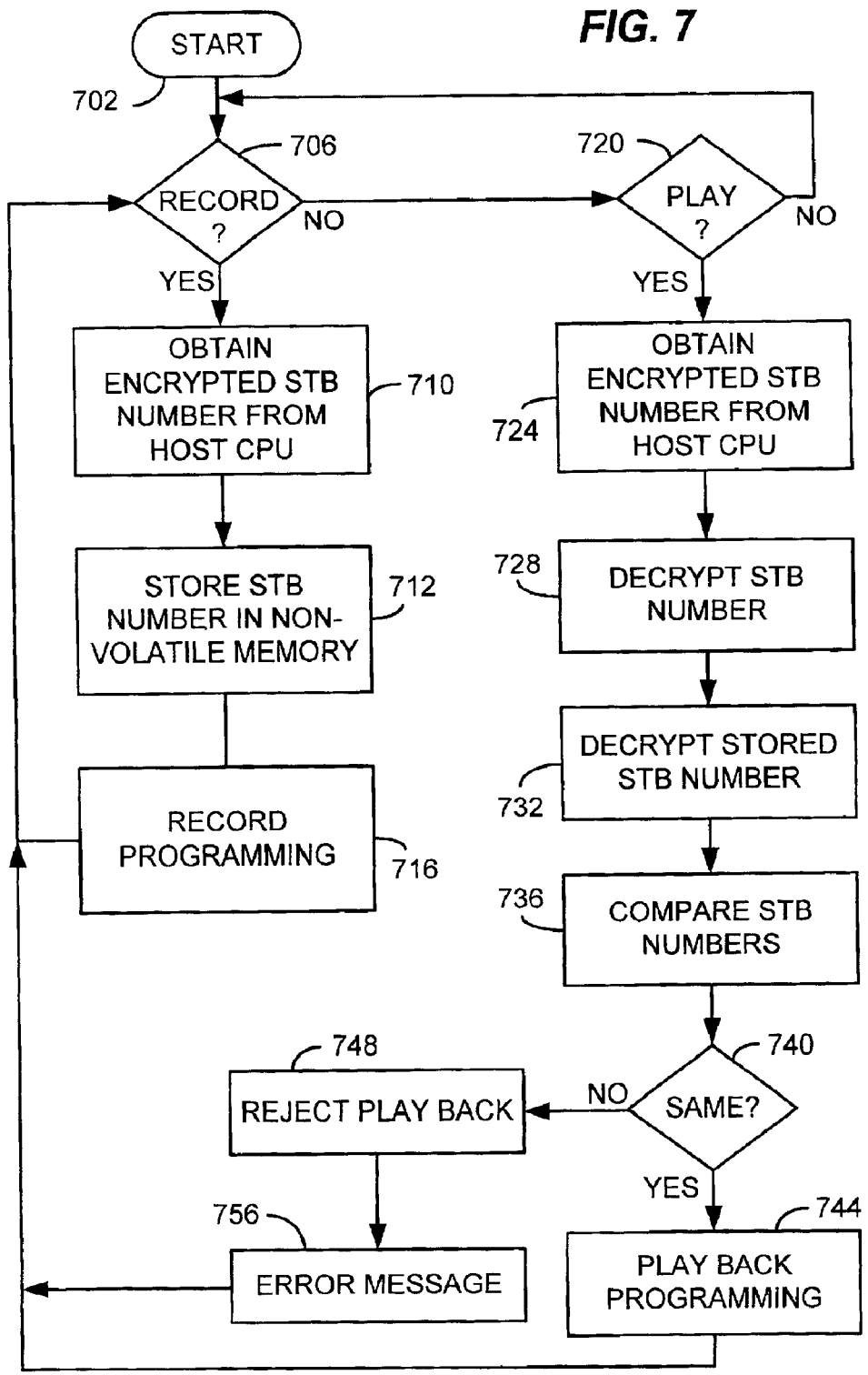
FIG. 7 is a flow chart depicting a process of providing pair security in a recorder consistent with certain embodiments of the present invention.

The pairing security feature of the preferred embodiment is illustrated in FIG. 7 as process 700 starting at 702. In the event the user wishes to initiate recording at 706 by issuing a command from remote controller 256, the PC card CPU 270 obtains an encrypted Set-Top Box number from the host CPU 250 at 710. The STB number (or other appropriate information) is stored in nonvolatile memory (e.g., memory associated with CPU 270) at 712 and the program is recorded at 716. When the user issues a playback command at 720, the PC card CPU 270 again obtains an encrypted STB number from the hosts CPU 250 at 724. This STB number is decrypted at 728. The stored STB number is decrypted at 732 and the two numbers are compared at 736. If they are the same at 740, the programming is played back at 744 and control returns to 706. If they were not the same, however, the playback is rejected at 748 and an error message is issued at 756 notifying the user is that playback is not possible since of the programming was recorded with a different Set-Top Box. While this embodiment is described in terms of a Set-Top Box number, it can equivalently be realized using any information that can be used by the PC card to authenticate the STB.

Figure 8:
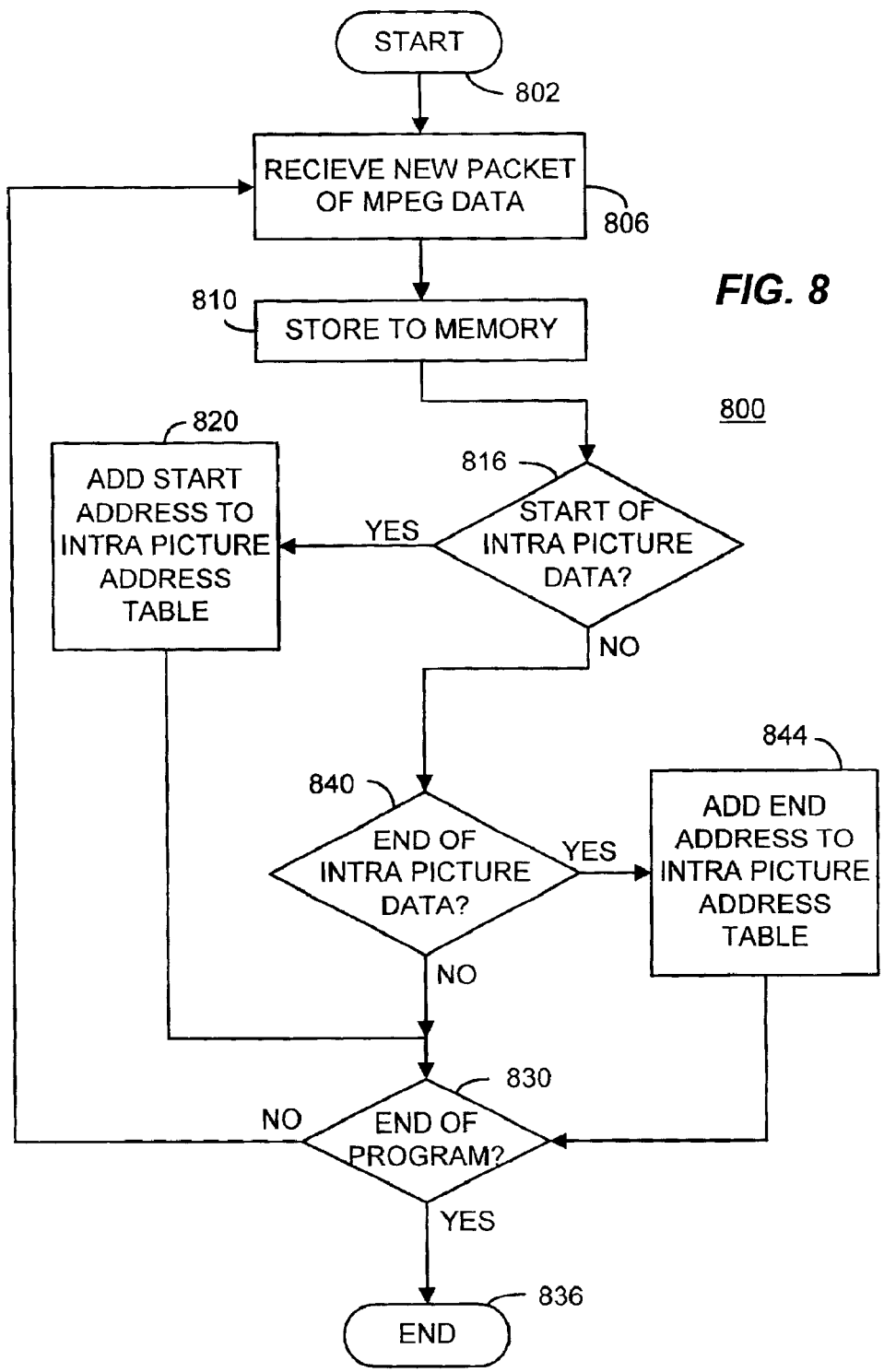
FIG. 8 is a flow chart depicting a process of an intra picture recording process consistent with certain embodiments of the present invention.

As previously discussed, the present invention can provide trick mode operations such as an intra picture only playback. This technique is applicable to MPEG encoded digital video signals wherein intra-coded pictures (I-Pictures), as distinguished from inter-coded pictures such as predictive coded pictures (P-Pictures) and bi-directional Predicted Pictures (B-Pictures) make up a group of pictures (GOP). The record process used to provide intra picture only playback is illustrated in FIG. 8 as process 800 starting at 802. This process is carried out within the PC card recorder by the TP/P.filter 354 in cooperation with CPU 270, memory interface 358 and memory 370. At 806 a new packet of MPEG data is received at TP/P.filter 354, and the packet is stored to memory 370 by the memory interface 358 at 810. If the new packet represents the start of an intra picture at 816, as determined by the TP/P.filter 354 or CPU 270, the start address for the memory location storing the packet is added to an intra picture address table by CPU 270 at 820. Control then passes to 830. If not, control passes to 840 where it is determined by TP/P.filter 354 if the packet represents the end of the intra picture data. If so, the address of the memory location storing this packet is added to the intra picture table at 844 by CPU 270. If not, control passes to 830 to determine if the end of the program has been reached. If not, control returns to 806. When the end of the program is reached, the process ends at 836. The intra picture table can be stored in memory 370 or, alternatively, in memory associated with the CPU 270. TABLE 1 below generally represents the information stored in the intra picture address table. The Packet Identifier (PID) determines the association of the packet with a particular program.

TABLE 1

| PID | INTRA START ADDRESS | INTRA END ADDRESS |
|---|---|---|
| 0x10 | sector 0x00110000 | sector 0x00112000 |
| 0x10 | sector 0x00150000 | sector 0x00153000 |
| ... | ... | ... |

Playback of the program using the intra picture mode can be accomplished by process 900 of FIG. 9 starting at 902. At 906 if the intra picture mode is not selected, normal playback (or other mode of playback handling) is carried out at 910. In the event intra picture playback mode is selected at 906, the start address and end address in memory 370 for a first picture is read from the intra picture address table by CPU 270 at 914. The read pointer of memory 370 is then moved to the start address by memory interface 358 and data is read through the intra picture end address at 918 by memory interface 358 under control CPU 270. The memory interface 358 sends the information read from memory 370 to encrypter 214 where the information is encrypted.

The encrypted information is sent to the STB decrypter 224 through the POD interface 212. The decryption, decoding and playback of the picture is then carried out within the STB using encrypter 224, TP/demultiplexer 230 and video decoder 240 at 934. Simultaneously, in the PC card recorder, CPU 270 determines at 938 if the start and end addresses represent the last address pair in the current program at 938 (either by reference to the intra address table's PID entry or by reading a PID stored with the next intra address pair. If the last address pair has been read, the process ends at 944. If not, the next address pair location in the intra picture address table is incremented at 950 and control returns to 914 where the next start and end address is retrieved from the intra picture address table.

Referring now to FIG. 10, an alternative embodiment of a PC card recorder 1050 having either record-only mode or short time-shift mode is illustrated. In this embodiment, block 354 of FIG. 3 (or FIG. 6) is replaced with a packet filter 1054 without a transport parser. In this embodiment, the TP/demultiplexer 230 of the STB 130 parses the program information and the host CPU 250 communicates with CPU 270 to have CPU 270 command block 354 to drop unnecessary packets. In this embodiment, TP/demultiplexer 230 obtains the newest program information from the input stream. In record-only mode, memory interface 358 sends the input stream both to memory 370 and to encrypter 214. The encrypted data stream from encrypter 214 is sent to TP/demultiplexer 230 through decrypter 224.

In long time-shift mode, for example, in 1-hour delayed playback, the program specific information in the program specific information tables (e.g., MPEG PAT table, PMT table, etc.) might have changed. Thus, the most current program specific information tables may not accurately reflect the program information stored in memory 370. In order to avoid use of an erroneous program specific information table, the tables in their form at the time of recording, are stored within a memory location provided in the packet filter 1054. Thus, in the current example, for playback, the TP/demultiplexer 230 obtains the 1-hour old program information, which would differ from the current program information, from packet filter 1054 in order to play back the stored program. In other embodiments, the program specific information tables can be stored with the program in memory 370 or in any other suitable storage location without departing from the present invention. In other embodiments, the encryption arrangement as illustrated in FIG. 6 can be incorporated in the PC card recorder 1050.

In another embodiment of the present invention, the recorder functions can be implemented in a non-OpenCable™ compliant card. Similarly, decryption and encryption in 218 and 214 are not required to be Open-Cable™ compliant. Additionally, other types of cards (for example, a smart card) can be used to embody a recorder consistent with the present invention. The various functions of the card (e.g., encryption, decryption, memory management, filtering functions, etc.) can be carried out using dedicated hardware, one or more programmed processors or a combination thereof without departing from the invention.

The PC card recorder of the present invention has the advantages of being small and mechanically robust. Upgrades are easy by simply changing the PC card. The invention provides good performance for short time shift or short playback operations. No dedicated hardware interface required since the existing POD slot is used. The data stored in the memory is secure (POD copy protection compliant. Card-STB pairing security) and flexible (since by software download, decryption and re-encryption can be modified, and software bugs can be easily fixed). The arrangement is easily expandable by use of a second card as illustrated in the embodiment of FIG. 5.

The embodiments described utilize dedicated hardware encryption and decryption processors as preferred embodiments. However, those skilled in the art will recognize that encryption and decryption can equivalently be carried out in software using a suitably programmed processor. Filtering, parsing, pointer management, time stamping and other functions can similarly be carried out using hardware, software running on a suitably programmed processor or any combination thereof.

While the present invention is described in terms of an exemplary digital Set-Top Box for storage of A/V content. However, those skilled in the art will appreciate that current broadband content delivery systems such as cable and satellite television systems are also capable of delivery of other forms of content such as Internet services, video, text, data, voice, fax, web pages and other information and it is explicitly contemplated that the present invention can be used to store and retrieve such data.

Those skilled in the art will recognize that the present invention has been described in terms of exemplary embodiments based upon use of a programmed processor. However, the invention should not be so limited, since the present invention could be implemented using hardware component equivalents such as special purpose hardware and/or dedicated processors which are equivalents to the invention as described and claimed. Similarly, general purpose computers, microprocessor based computers, microcontrollers, optical computers, analog computers, dedicated processors and/or dedicated hard wired logic may be used to construct alternative equivalent embodiments of the present invention.

Those skilled in the art will appreciate that the program steps and associated data used to implement the embodiments described above can be implemented other forms of storage including Read Only Memory (ROM) devices. The program content storage, while preferably in solid state non-volatile memory such as flash memory can also be carried out using volatile memory such as Random Access Memory (RAM) devices and/or other equivalent storage technologies without departing from the present invention. Such alternative storage devices should be considered equivalents. Moreover, while some of the methods described in conjunction with the present invention may be most advantageously carried out using solid state non-volatile memory, they may also be applied to systems using hard disc drive technology or other forms of electronic storage media without departing from the invention.

The present invention is preferably implemented using a programmed processor to control the processes described by executing programming instructions that are broadly described above in flow chart form that can be stored on any suitable electronic storage medium or transmitted over any suitable electronic communication medium. However, those skilled in the art will appreciate that the processes described above can be implemented in any number of variations and in many suitable programming languages without departing from the present invention. For example, the order of certain operations carried out can often be varied, and additional operations can be added without departing from the invention. Error trapping can be added and/or enhanced and variations can be made in user interface and information presentation without departing from the present invention. Such variations are contemplated and considered equivalent.

While the invention has been described in conjunction with specific embodiments, it is evident that many alternatives, modifications, permutations and variations will become apparent to those skilled in the art in light of the foregoing description. Accordingly, it is intended that the present invention embrace all such alternatives, modifications and variations as fall within the scope of the appended claims.

What is claimed is:

1. A PC card video recording device, comprising:
   a PCMCIA compliant connector;
   a decrypter that receives encrypted video data through the connector and decrypts the video data into a video data stream;
   a memory;
   a processor; and
   a filter, receiving the video data stream, and sending a portion of the video data stream specified by the processor to the memory for storage.

2. The apparatus according to claim 1, further comprising an encrypter that receives data stored in the memory, encrypts the data and sends the data to the connector, under control of the processor.

3. The apparatus according to claim 1, further comprising a memory interface receiving the video data stream from the filter that stores the data stream in the memory.

4. The apparatus according to claim 2, further comprising a memory interface receiving the video data stream from the filter that stores the data stream in the memory, and that retrieves the stored data from the memory and sends the retrieved data to the encrypter.

5. The apparatus according to claim 4, wherein the stored data is retrieved according to a packet identifier associated with the stored data.

6. The apparatus according to claim 4, further comprising a reference clock that sends timing information to the memory interface for storage with the video data stream.

7. The apparatus according to claim 1, further comprising means for receiving a smart card, the smart card containing data used to generate a decryption key used by the decrypter.

8. The apparatus according to claim 2, further comprising means for receiving a smart card, the smart card containing data used to generate a decryption key used by the decrypter and an encryption key used by the encrypter.

9. The apparatus according to claim 1, further comprising an encrypter that encrypts the data stream prior to storage in the memory.

10. The apparatus according to claim 2, further comprising a second encrypter that encrypts the data stream prior to storage in the memory, and a second decrypter that decrypts the data retrieved from memory prior to encrypting the data using the encrypter and sending the data to the connector.

11. The apparatus according to claim 1, wherein the memory comprises solid state non-volatile memory.

12. The apparatus according to claim 2, wherein the memory comprises solid state non-volatile memory.

13. A PC card recording device, comprising:
   a PCMCIA compliant connector;
   a decrypter that receives encrypted data through the connector and decrypts the data into a data stream;
   a memory;
   a processor; and
   a filter, receiving the data stream, and sending a portion of the data stream specified by the processor to the memory for storage.

14. The apparatus according to claim 13, further comprising an encrypter that receives data stored in the memory, encrypts the data and sends the data to the connector, under control of the processor.

15. The apparatus according to claim 13, further comprising a memory interface receiving the data stream from the filter and that stores the data stream in the memory.

16. The apparatus according to claim 14, further comprising a memory interface receiving the data stream from the filter and storing the data stream in the memory, and that retrieves the stored data from the memory and sends the retrieved data to the encrypter.

17. The apparatus according to claim 16, wherein the stored data is stored and retrieved according to a packet identifier associated with the stored data.

18. The apparatus according to claim 15, further comprising a reference clock that sends timing information to the memory interface for storage with the data stream.

19. The apparatus according to claim 13, further comprising means for receiving a smart card, the smart card containing information used to generate a decryption key used by the decrypter.

20. The apparatus according to claim 14, further comprising means for receiving a smart card, the smart card containing information used to generate a decryption key used by the decrypter and an encryption key used by the encrypter.

21. The apparatus according to claim 13, further comprising an encrypter that encrypts the data stream prior to storage in the memory.

22. The apparatus according to claim 14, further comprising a second encrypter that encrypts the data stream prior to storage in the memory, and a second decrypter that decrypts the data retrieved from memory prior to encrypting the data using the encrypter and sending the data to the connector.

23. The apparatus according to claim 13, wherein the memory comprises solid state non-volatile memory.

24. The apparatus according to claim 14, wherein the memory comprises solid state non-volatile memory.

25. A PC card video recording and playback device, comprising:
    a PCMCIA compliant connector;
    a first decrypter that receives encrypted video data through the connector and decrypts the video data into a video data stream;
    a solid state non-volatile memory;
    a memory interface;
    a processor;
    a filter, receiving the video data stream, and sending a portion of the video data stream associated with a packet identifier specified by the processor to the memory interface for storage in the memory;
    a reference clock that sends timing information to the memory interface for storage with the video data stream; and
    a first encrypter that receives data stored in the memory according to a packet identifier associated with the stored data from the memory interface, encrypts the data and sends the data to the connector, under control of the processor.

26. The apparatus according to claim 25, further comprising means for receiving a smart card, the smart card containing information used to generate a decryption key used by the first decrypter and an encryption key used by the first encrypter.

27. The apparatus according to claim 25, further comprising a second encrypter that encrypts the data stream prior to storage in the memory.

28. The apparatus according to claim 25, further comprising a second encrypter that encrypts the data stream prior to storage in the memory, and a second decrypter that decrypts the data retrieved from memory prior to encrypting the data using the first encrypter and sending the data to the connector.

29. A method, carried out in a PC card recorder, of storing video programming on the PC card recorder, comprising:
    receiving an encrypted video data stream;
    decrypting the encrypted video data stream to produce a video data stream;
    filtering the video data stream to remove data not related to a program identified by a packet identifier to produce a filtered video data stream; and
    storing the filtered video data stream in a solid state memory.

30. The method according to claim 29, further comprising encrypting the filtered video data stream before storing the filtered video data stream in the solid state memory.

31. The method according to claim 29, further comprising time stamping the filtered video data stream before storing the filtered video data stream in the solid state memory.

32. The method according to claim 29, further comprising incrementing a write pointer associated with the memory as the filtered video data stream is stored to the memory.

33. The method according to claim 29, wherein the encrypted video data stream is received through a PCMCIA compliant connector.

34. The method according to claim 29, wherein the receiving, decrypting, filtering and storing are carried out under instructions from a programmed processor.

35. A method, carried out in a PC card recorder, of playback of video programming stored on the PC card recorder, comprising:
    identifying a packet identifier associated with a program to be played;
    retrieving a video data stream associated with the packet identifier from a solid state memory;
    encrypting the video data stream to produce an encrypted video data stream; and
    sending the encrypted video data stream to a PCMCIA connector.

36. The method according to claim 35, further comprising decrypting the video data stream after retrieving and before encrypting and sending.

37. The method according to claim 35, wherein the video data stream includes time stamps.

38. The method according to claim 37, wherein the encrypted video data stream is sent to the PCMCIA connector at a time determined by the time stamps.

39. The method according to claim 35, further comprising incrementing a read pointer associated with the memory as the video data stream is retrieved from the memory.

40. The method according to claim 35, wherein the identifying, retrieving, encrypting and sending are carried out under instructions from a programmed processor.

41. A recording module, comprising:
    a connector suitable for interconnecting with a conditional access point of deployment module (POD) connector in a receiver;
    a memory; and
    circuit means for receiving information through the connector and for storing the information on the memory.

42. The apparatus according to claim 41, further comprising a decrypter that receives the information in encrypted form through the connector and decrypts the information to produce a decrypted data stream.

43. The apparatus according to claim 42, further comprising means for receiving a smart card within the recording module, the smart card containing information used to generate a decryption key used by the decrypter.

44. The apparatus according to claim 42, further comprising:
a processor; and
a filter, receiving the data stream, and sending a portion of the data stream associated with a packet identifier specified by the processor to the memory for storage.

45. The apparatus according to claim 44, further comprising a memory interface, receiving the data stream from the filter, that stores the data stream in the memory.

46. The apparatus according to claim 45, further comprising a reference clock that sends timing information to the memory interface for storage with the data stream.

47. The apparatus according to claim 41, further comprising:
a processor; and
a filter, receiving the information, and sending a portion of the information associated with a packet identifier specified by the processor to the memory for storage.

48. The apparatus according to claim 41, further comprising an encrypter that receives data stored in the memory, encrypts the data and sends the data to the connector.

49. The apparatus according to claim 48, further comprising an encrypter that encrypts the data stream prior to storage in the memory, and a decrypter that decrypts the data retrieved from memory prior to encrypting the data using the encrypter and sending the data to the connector.

50. The apparatus according to claim 48, further comprising means for receiving a smart card within the module, the smart card containing an encryption key used by the encrypter.

51. The apparatus according to claim 48, further comprising a memory interface that retrieves the stored data from the memory and sends the retrieved data to the encrypter.

52. The apparatus according to claim 51, wherein the stored data is retrieved according to a packet identifier associated with the stored data.

53. The apparatus according to claim 41, wherein the connector comprises a PCMCIA compliant connector.

54. The apparatus according to claim 41, further comprising a encrypter that encrypts the data stream prior to storage in the memory.

55. The apparatus according to claim 41, wherein the memory comprises solid state non-volatile memory.

56. The apparatus according to claim 41, wherein the information contains video content.

57. A method, comprising:
receiving a stream of information through a conditional access point of deployment module (POD) connector in a receiver; and
storing at least a portion of the stream of information in a memory.

58. The method according to claim 57, wherein the stream of information is encrypted, and further comprising decrypting the stream of information.

59. The method according to claim 58, further comprising generating a decryption key, retrieving the information from the memory and decrypting the information using the decryption key.

60. The method according to claim 57, further comprising filtering the stream of information to remove information not associated with a specified packet identifier.

61. The method according to claim 57, further comprising storing timing information from a reference clock with the stream of information.

62. The method according to claim 61, further comprising:
retrieving the stored information;
sending the retrieved information to an encrypter at a time determined by the time stamp;
encrypting the stored information; and
transmitting the encrypted information to the receiver through the conditional access point of deployment module (POD) connector.

63. The method according to claim 57, further comprising:
retrieving the stored information;
encrypting the stored information; and
transmitting the stored information to the receiver through the conditional access point of deployment module (POD) connector.

64. The method according to claim 63, further comprising reading an encryption key from a smart card, and wherein the stream of information is encrypted using the encryption key read from the smart card.

65. The method according to claim 63, wherein the stored information is retrieved according to a packet identifier associated with the stored information.

66. The method according to claim 57, wherein the connector comprises a PCMCIA compliant connector.

67. The method according to claim 58, further comprising encrypting the stream of information prior to storage in the memory.

68. The memory according to claim 57, wherein the memory comprises solid state memory.

69. The apparatus according to claim 58, wherein the memory comprises solid state memory.

70. The method according to claim 57, carried out under control of a programmed processor.

71. The method according to claim 57, wherein the receiver comprises an OpenCable compliant receiver.

72. The method according to claim 57, wherein the receiver is part of a television Set-Top Box.

73. The method according to claim 57, wherein the receiver is part of a television receiver.

74. The method according to claim 57, wherein the information comprises video information.

75. An electronic storage medium, storing instructions which, when executed on a programmed processor, carry out a method of recording video, comprising:
receiving stream of video information through a conditional access point of deployment module (POD) connector in a video receiver; and
storing at least a portion of the stream of video information in a memory.

76. A PC card device, comprising:
a PCMCIA compliant connector;
a decrypter that receives encrypted video data through the connector and decrypts the video data into a video data stream;
a memory;
a processor;
a filter, receiving the video data stream, and sending a portion of the video data stream associated with a packet identifier specified by the processor to the memory for storage; and
an encrypter that receives data stored in the memory, encrypts the data and sends the data to the connector, under control of the processor.

77. The apparatus according to claim 76, further comprising a memory interface, receiving the video data stream from the filter, that stores the data stream in the memory, and that retrieves the stored data from the memory and sends the retrieved data to the encrypter.

78. The apparatus according to claim 77, further comprising a reference clock that sends timing information to the memory interface for storage with the video data stream.

79. The apparatus according to claim 77, further comprising means for receiving a smart card, the smart card containing information used to generate a decryption key used by the decrypter and an encryption key used by the encrypter.

80. A PC card device, comprising:
- a PCMCIA compliant connector;
- a first decrypter that receives encrypted video data through the connector and decrypts the video data into a video data stream;
- a memory;
- a processor;
- a second encrypter;
- a filter, receiving the video data stream, and sending a portion of the video data stream associated with a packet identifier specified by the processor to the second encrypter for encrypting the video data stream to produce an encrypted video data stream;
- a memory interface for receiving the encrypted video data stream for storage in the memory, and for retrieving the encrypted video data stream from the memory;
- a second decrypter that decrypts the video data stream retrieved from memory; and
- a first encrypter that receives video data stream from the second decrypter, encrypts the video data stream and sends the encrypted video data stream to the connector, under control of the processor.

81. The apparatus according to claim 80, further comprising a reference clock that sends timing information to the memory interface for storage with the video data stream.

82. The apparatus according to claim 80, further comprising means for receiving a smart card, the smart card containing data used to generate a decryption key used by the first decrypter and an encryption key used by the first encrypter.

83. The apparatus according to claim 80, wherein the memory comprises solid state non-volatile memory.

84. A video device, comprising:
- a conditional access point of deployment module (POD) interface for receiving a point of deployment module;
- a receiver front end unit receiving a signal containing video information and sending a video stream to the POD interface;
- a circuit card coupled to POD interface and receiving the video stream;
- a memory residing on the circuit card; and
- a memory interface residing on the circuit card for storing video content forming a part of the video stream in the memory.

85. The apparatus according to claim 84, wherein the video stream is encrypted, and further comprising a decrypter residing on the circuit card that decrypts the encrypted video stream to produce a decrypted video stream.

86. The apparatus according to claim 85, further comprising a filter residing on the circuit card that removes information from the decrypted video stream not relevant to the video content to produce a filtered video stream, and wherein the video content comprises the filtered video stream.

87. The apparatus according to claim 86, wherein the memory interface also retrieves the stored video content from the memory.

88. The apparatus according to claim 87, further comprising an encrypter residing on the circuit card that encrypts the retrieved video content and sends the encrypted video content to the POD interface.

89. The apparatus according to claim 88, further comprising a decrypter that receives the encrypted video content and decrypts the encrypted video content to produce decrypted video content.

90. The apparatus according to claim 89, further comprising:
- a demultiplexer that receives the decrypted video content and separates the decrypted video content into video and audio components;
- an audio decoder receiving the audio components and converting the audio components into an audio signal output that can be played by a television set; and
- a video decoder receiving the video components and converting the video components into a video signal output that can be played by the television set.

91. The apparatus according to claim 84, further comprising a reference clock residing on the circuit card that sends timing information to the memory interface for storage in the memory with the video data stream.

92. The apparatus according to claim 84, further comprising means for receiving a smart card, the smart card containing data used to generate a decryption key used by the decrypter.

93. The apparatus according to claim 88, further comprising means for receiving a smart card, the smart card containing information used to generate a decryption key used by the decrypter and an encryption key used by the encrypter.

94. The apparatus according to claim 84, wherein the memory comprises solid state memory.

95. The apparatus according to claim 84, wherein the memory comprises solid state non-volatile memory.

96. The apparatus according to claim 85, wherein the video device comprises one of a television Set-Top Box and a television set.

97. A video device, comprising:
- a conditional access point of deployment module (POD) interface for receiving a point of deployment module;
- a receiver front end unit receiving a signal containing video information and sending a video stream to the POD interface;
- a circuit card coupled to POD interface and receiving the video stream wherein the video stream is encrypted;
- a memory residing on the circuit card;
- a decrypter residing on the circuit card that decrypts the encrypted video stream to produce a decrypted video stream;
- a filter residing on the circuit card that removes information from the decrypted video stream not relevant to the video content to produce a filtered video stream;
- a memory interface residing on the circuit card for storing the filtered video stream in the memory, and for retrieving the stored video stream from the memory to obtain a retrieved video stream; and
- an encrypter residing on the circuit card that encrypts the retrieved video stream and sends the encrypted retrieved video stream to the POD interface.

98. The apparatus according to claim 97, further comprising a decrypter that receives the encrypted retrieved video content from the POD interface and decrypts the encrypted retrieved video content to produce decrypted video content.

99. The apparatus according to claim 98, further comprising:
a demultiplexer that receives the decrypted video content and separates the decrypted video content into video and audio components;
an audio decoder receiving the audio components and converting the audio components into an audio signal output that can be played by a television set; and
a video decoder receiving the video components and converting the video components into a video signal output that can be played by the television set.

100. The apparatus according to claim 97, further comprising a reference clock residing on the circuit card that sends timing information to the memory interface for storage in the memory with the filtered video data stream.

101. The apparatus according to claim 97, further comprising means for receiving a smart card, the smart card containing data used to generate a decryption key used by the decrypter and an encryption key used by the encrypter.

102. The apparatus according to claim 97, wherein the memory comprises solid state memory.

103. The apparatus according to claim 97, wherein the memory comprises solid state non-volatile memory.

104. The apparatus according to claim 97, wherein the video device comprises one of a television Set-Top Box and a television set.

105. A method of operation of a video device, comprising:
sending a video stream to a conditional access point of deployment module (POD) interface;
receiving the video stream at a circuit card coupled to the POD interface; and
storing video content forming a part of the video stream in a memory residing on the circuit card.

106. The method according to claim 105, wherein the video stream is encrypted, and further comprising decrypting the encrypted video stream to produce a decrypted video stream using a decrypter residing on the circuit card.

107. The method according to claim 106, further comprising removing information from the decrypted video stream not relevant to the video content to produce a filtered video stream using a filter residing on the circuit card, and wherein the video content comprises the filtered video stream.

108. The method according to claim 107, further comprising encrypting the retrieved video content using an encrypter residing on the circuit card and sending the encrypted video content to the POD interface.

109. The method according to claim 108, further comprising receiving the encrypted video content and decrypting the encrypted video content to produce decrypted video content.

110. The method according to claim 109, further comprising:
separating the decrypted video content into video and audio components;
converting the audio components into an audio signal output that can be played by a television set; and
converting the video components into a video signal output that can be played by the television set.

111. The method according to claim 105, further comprising storing timing information from a reference clock residing on the circuit card in the memory with the video data stream.

112. The method according to claim 106, further comprising obtaining a decryption key for use by the decrypter.

113. The method according to claim 108, further comprising obtaining a decryption key for use by the decrypter and an encryption key for use by the encrypter.

114. The method according to claim 105, wherein the memory comprises solid state memory.

115. The method according to claim 105, wherein the memory comprises solid state non-volatile memory.

116. The method according to claim 105, carried out in one of a television Set-Top Box and a television set.

117. An electronic storage medium storing instructions which, when executed on a programmed processor, carry out a method of operation of a video device, comprising:
sending a video stream derived from the video signal to a conditional access point of deployment module (POD) interface;
receiving the video stream at a circuit card coupled to the POD interface; and
storing video content forming a part of the video stream in a memory residing on the circuit card.

118. A video device, comprising:
a first conditional access point of deployment module (POD) interface for receiving a first point of deployment module;
a second conditional access point of deployment module (POD) interface for receiving a second point of deployment module; and
receiver front end means for receiving a signal containing video information and sending a first video stream to the first POD interface, and a second video stream to the second POD interface.

119. The apparatus according to claim 118, further comprising:
a first circuit card coupled to the first POD interface and receiving the first video stream;
a first memory residing on the first circuit card; and
means residing on the first circuit card for storing first video content forming a part of the video stream in the first memory.

120. The apparatus according to claim 119, wherein the first video stream is encrypted, and further comprising a first decrypter residing on the first circuit card that decrypts the encrypted first video stream to produce a decrypted first video stream.

121. The apparatus according to claim 120, further comprising a first filter residing on the first circuit card that removes information from the decrypted first video stream not relevant to the first video content.

122. The apparatus according to claim 118, further comprising means residing on the first circuit card for retrieving the first video content from the first memory and sending the first video content to the first POD interface.

123. The apparatus according to claim 122, further comprising a first encrypter residing on the first circuit card for encrypting the first video content prior to sending the first video content to the first POD interface.

124. The apparatus according to claim 119, further comprising:
a second circuit card coupled to the second POD interface and receiving the second video stream;
a second memory residing on the second circuit card; and
means residing on the second circuit card for storing second video content forming a part of the video stream in the second memory.

125. The apparatus according to claim 124, wherein the second video stream is encrypted, and further comprising a second decrypter residing on the second circuit card that decrypts the encrypted second video stream to produce a decrypted second video stream.

126. The apparatus according to claim 125, further comprising a second filter residing on the second circuit card that removes information from the decrypted second video stream not relevant to the second video content.

127. The apparatus according to claim 125, further comprising means residing on the second circuit card for retrieving the second video content from the second memory and sending the second video content to the second POD interface.

128. The apparatus according to claim 127, further comprising a second encrypter residing on the second circuit card for encrypting the second video content prior to sending the second video content to the second POD interface.

129. The apparatus according to claim 128, further comprising means residing on the second circuit card for retrieving the second video content from the second memory and sending the second video content to the second POD interface.

130. The apparatus according to claim 129, further comprising a second encrypter residing on the second circuit card for encrypting the second video content prior to sending the second video content to the second POD interface.

131. The apparatus according to claim 119, further comprising:
 a second circuit card coupled to the second POD interface and receiving the second video stream;
 a second memory residing on the second circuit card;
 means residing on the second circuit card for storing second video content forming a part of the video stream in the second memory; and
 means residing on the second circuit card for retrieving the second video content from the second memory and sending the second video content to the second POD interface.

132. The apparatus according to claim 131, further comprising means for selecting one of the first and second video content from the first and second POD interfaces.

133. The apparatus according to claim 132, further comprising a decrypter that receives the selected video content and decrypts the selected video content.

134. The apparatus according to claim 118, wherein the video device comprises one of a television Set-Top Box and a television set.

135. The apparatus according to claim 133, further comprising:
 a demultiplexer that receives the decrypted selected video content and separates the decrypted selected video content into video and audio components;
 an audio decoder receiving the audio components and converting the audio components into an audio signal output that can be played by a television set; and
 a video decoder receiving the video components and converting the video components into a video signal output that can be played by the television set.

136. The apparatus according to claim 118, wherein the receiver front end means comprises a first receiver front end and a second receiver front end.

137. A method of recording a digital video signal, comprising:
 receiving a digitally encoded video signal, the signal having pictures encoded as groups of pictures with the groups of pictures having intra-coded pictures, and inter-coded pictures;
 storing the digitally encoded video signal to an addressable storage device; and
 storing in a table a starting address and an ending address for each intra-coded picture.

138. A method of retrieving a digitally encoded video signal stored in an addressable electronic storage device, the signal having pictures encoded as groups of pictures with the groups of pictures having intra-coded pictures, and inter-coded pictures, the method comprising:
 for each of a plurality of intra-coded pictures:
  looking up a starting address in a table for an intra-coded picture;
  looking up an ending address in the table for the intra-coded picture; and
  retrieving the intra-coded picture from the addressable storage device.

139. The method according to claim 138, displaying the retrieved intra-coded pictures on a display.

140. A method of recording a digital video signal, comprising:
 receiving a digitally encoded video signal, the signal having pictures encoded as groups of pictures with the groups of pictures having intra-coded pictures, and inter-coded pictures;
 determining which of the pictures are intra-coded pictures;
 storing the digitally encoded video signal to a storage device; and
 storing in a header associated with each intra-coded picture with an identifier identifying the picture to be an intra-coded picture.

141. The method according to claim 140, wherein the header contains an indicator of a starting point for an intra-coded picture.

142. The method according to claim 140, wherein the header contains an indicator of an ending point for an intra-coded picture.

143. A method of retrieving a digitally encoded video signal stored in an electronic storage device, the signal having pictures encoded as groups of pictures with the groups of pictures having intra-coded pictures, and inter-coded pictures, the method comprising:
 for each of a plurality of pictures:
  reading a header associated with each picture;
  determining from an identifier in the header whether the picture is an intra-coded picture; and
  if so, retrieving the intra-coded picture.

144. The method according to claim 143, displaying the retrieved intra-coded pictures on a display.

145. A method of providing pairing security in a PC card recorder, comprising:
 at the PC card recorder, receiving an identifier from a host device;
 storing the identifier in the PC card recorder;
 receiving a digital video signal from the host device; and
 storing the digital video signal in a memory of the PC card recorder.

146. A method of providing pairing security in a PC card recorder, comprising:
 receiving a request to play a stored digital video signal;
 at the PC card recorder, retrieving a stored host device identifier from a memory;
 at the PC card recorder, receiving an identifier from the host device;

at the PC card recorder, comparing the identifier with the stored identifier; and playing the stored digital video signal from a memory of the PC card recorder if the identifier and the stored identifier match.

147. The method according to claim 146, further comprising rejecting the request to play in the event the identifier and the stored identifier do not match.

148. A method of recording a television program, comprising:

receiving a command signal from a remote commander to record a selected television program;

at a host processor, determining a packet identifier corresponding to the selected television program;

sending the packet identifier along with a record command to a POD interface;

at a PC card recorder;

receiving a transport stream from the POD interface;

receiving the packet identifier and the record command from the POD interface;

instructing a transport stream filter to delete packets not associated with the packet identifier; and recording the packets associated with the packet identifier to a memory.

149. A method of recording a television program at a PC card recorder, comprising:

receiving a transport stream from a POD interface;

receiving the packet identifier and the record command from the POD interface;

instructing a transport stream filter to delete packets not associated with the packet identifier; and recording the packets associated with the packet identifier to the PC card recorder connected to the POD interface.

150. A method of storing information from an MPEG transport stream, comprising:

receiving a picture from the MPEG transport stream;

determining a type associated with the picture; and storing a type indicator along with the picture in a memory.

151. The method according to claim 150, wherein the type indicator is stored in a table.

152. The method according to claim 151, wherein the type indicator is stored in the table along with a starting address for the packet.

153. The method according to claim 150, wherein the type indicator is stored in a packet header.

\* \* \* \* \*